United States Patent
Kolesnikov et al.

(10) Patent No.: US 10,021,403 B2
(45) Date of Patent: Jul. 10, 2018

(54) METHOD, APPARATUS AND SYSTEM FOR PREDICTING A BLOCK OF VIDEO SAMPLES

(71) Applicant: CANON KABUSHIKI KAISHA, Tokyo (JP)

(72) Inventors: Volodymyr Kolesnikov, Dee Why (AU); Christopher James Rosewarne, Concord West (AU)

(73) Assignee: Canon Kabushiki Kaisha, Tokyo (JP)

(*) Notice: Subject to any disclaimer, the term of this patent is extended or adjusted under 35 U.S.C. 154(b) by 315 days.

(21) Appl. No.: 14/833,528

(22) Filed: Aug. 24, 2015

(65) Prior Publication Data
US 2016/0057430 A1 Feb. 25, 2016

(30) Foreign Application Priority Data

Aug. 25, 2014 (AU) ................................ 2014216056

(51) Int. Cl.
*H04N 7/12* (2006.01)
*H04N 19/159* (2014.01)
*H04N 19/593* (2014.01)
*H04N 19/176* (2014.01)
*H04N 19/103* (2014.01)
*H04N 19/117* (2014.01)

(52) U.S. Cl.
CPC ......... *H04N 19/159* (2014.11); *H04N 19/103* (2014.11); *H04N 19/176* (2014.11); *H04N 19/593* (2014.11); *H04N 19/117* (2014.11)

(58) Field of Classification Search
CPC .. H04N 19/159; H04N 19/103; H04N 19/593; H04N 19/176; H04N 19/117
See application file for complete search history.

(56) References Cited

U.S. PATENT DOCUMENTS

| | | | |
|---|---|---|---|
| 5,943,042 A | 8/1999 | Siio | |
| 2014/0056352 A1* | 2/2014 | Park | H04N 19/117 375/240.12 |
| 2015/0365695 A1* | 12/2015 | Pu | H04N 19/176 375/240.16 |
| 2015/0382016 A1* | 12/2015 | Cohen | H04N 19/117 375/240.12 |

* cited by examiner

*Primary Examiner* — Tat C Chio
(74) *Attorney, Agent, or Firm* — Canon USA, Inc. I.P. Division

(57) ABSTRACT

A method of decoding a current block encoded using intra-prediction includes determining prediction modes for coding blocks neighboring the current block. The method generates prediction values for edge samples of the decoded block from intra-prediction reference samples of the neighboring coding blocks by applying an intra-prediction process to the intra-prediction encoded current block if a number of the neighboring coding blocks determined to one of use intra-block copy prediction mode and palette mode is greater than or equal to a predetermined threshold. Alternatively the method generates the prediction values for the edge samples of the decoded block from intra-prediction reference samples of the neighboring coding blocks by applying a filter, preferably an intra-boundary filter, to reference samples of the neighboring blocks. The current block is then decoded based on the prediction values.

20 Claims, 16 Drawing Sheets

METHOD, APPARATUS AND SYSTEM FOR PREDICTING A BLOCK OF VIDEO SAMPLES

REFERENCE TO RELATED PATENT APPLICATION(S)

This application claims the benefit under 35 U.S.C. § 119 of the filing date of Australian Patent Application No. 2014216056, filed Aug. 25, 2014, hereby incorporated by reference in its entirety as if fully set forth herein.

TECHNICAL FIELD

The present invention relates generally to digital video signal processing and, in particular, to a method, apparatus and system for predicting a block of video samples. The present invention also relates to a computer program product including a computer readable medium having recorded thereon a computer program for predicting a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" (ISO/IEC 14496-10) video coding standard. The new video coding standard has been named "high efficiency video coding (HEVC)". Further development of high efficiency video coding (HEVC) is directed towards introducing improved support for content known variously as 'screen content' or 'discontinuous tone content'. Such content is typical of video output from a computer or a tablet device, e.g. from a DVI connector or as would be transmitted over a wireless HDMI link. Such content is poorly handled by previous video compression standards and thus a new activity directed towards improving the achievable coding efficiency for this type of content is underway.

Video data includes one or more colour channels. Generally there is one primary colour channel and two secondary colour channels. The primary colour channel is generally referred to as the 'luma' channel and the secondary colour channel(s) are generally referred to as the 'chroma' channels. Video data is represented using a colour space, such as 'YCbCr' or 'RGB'. For screen content applications, 'RGB' is commonly used, as this is the format generally used to drive LCD panels. Note that the greatest signal strength is present in the 'G' (green) channel, so generally this channel is coded using the primary colour channel, and the remaining channels (i.e. 'B' and 'R') are coded using the secondary colour channels. This arrangement may be referred to as 'GBR'. When the 'YCbCr' colour space is in use, the 'Y' channel is coded using the primary colour channel and the 'Cb' and 'Cr' channels are coded using the secondary colour channels. Video data is also represented using a particular chroma format. The primary colour channel and the secondary colour channels are spatially sampled at the same spatial density when the 4:4:4 chroma format is in use. For screen content, the commonly used chroma format is 4:4:4, as generally LCD panels provide pixels at a 4:4:4 format. The bit-depth defines the bit width of samples in the respective colour channel, which implies a range of available sample values. Generally, all colour channels have the same bit-depth, although they may alternatively have different bit-depths.

In high efficiency video coding (HEVC), there are four types of prediction methods used: intra-prediction, intra-block copy prediction, palette prediction and inter-prediction. Intra-prediction and intra-block copy prediction allow content of one part of a video frame to be predicted from other parts of the same video frame. Intra-prediction methods typically produce a block having a directional texture, with an intra-prediction mode specifying the direction of the texture and neighbouring samples within a frame used as a basis to produce the texture. The intra-block copy prediction method uses a block of samples from the current frame as a prediction for a current block. Inter-prediction methods predict the content of a block within a video frame from blocks in previous video frames. The previous video frame used to provide the prediction block is selected using a reference index and each inter-predicted prediction unit (PU) has an independent reference index.

In content captured from an imaging sensor, also referred to as 'natural content' or 'continuous tone content', or 'camera captured content', generally all colour and luminosity transitions are smooth. Therefore a prediction of a block, such as intra-prediction, is likely to better predict the block if it has only smooth colour and luminosity transitions. For this reason a smoothing filter is usually applied to the prediction.

Frame data may also contain a mixture of screen content and camera captured content. For example, a computer screen may include various windows, icons and control buttons, text, and also contain a video being played, or an image being viewed. Such content, in terms of the entirety of a computer screen, can be referred to as 'mixed content'.

To maximise coding efficiency, the prediction method that produces a predicted block that is closest to captured frame data is typically used. The remaining difference between the predicted block of samples and the captured frame data is known as the 'residual'. This spatial domain representation of the difference is generally transformed into a frequency domain representation. The frequency domain representation includes a block of 'residual coefficients' that results from applying a transform, such as an integer discrete cosine transform (DCT). Moreover, the residual coefficients (or 'scaled transform coefficients') are quantised, which introduces loss but also further reduces the amount of information required to be encoded in a bitstream. The lossy frequency domain representation of the residual, also known as 'transform coefficients', may be stored in the bitstream. Each residual coefficient having a nonzero value is referred to as a 'significant' residual coefficient. The amount of lossiness in the residual recovered in a decoder affects the distortion of video data decoded from the bitstream compared to the captured frame data and the size of the bitstream.

The residual associated with a given block is able to compensate for errors in the prediction of the block. A more accurately predicted block, closer to the original frame data, requires less residual and results in an encoded bitstream with reduced bit-rate.

SUMMARY

It is an object of the present invention to substantially overcome, or at least ameliorate, one or more disadvantages of existing arrangements.

According to one aspect of the present disclosure there is provided a method of decoding a current block encoded using intra-prediction, the method comprising:

determining prediction modes for coding blocks neighbouring the current block;

generating prediction values for edge samples of the decoded block from intra-prediction reference samples of the neighbouring coding blocks by applying an intra-prediction process to the intra-prediction encoded current block if a number of the neighbouring coding blocks determined to one of use intra-block copy prediction mode and palette mode is greater than or equal to a predetermined threshold;

alternatively generating the prediction values for the edge samples of the decoded block from intra-prediction reference samples of the neighbouring coding blocks by applying a filter to reference samples of the neighbouring blocks; and decoding the current block based on the prediction values.

Preferably the pre-determined threshold is equal to one (1).

In a specific implementation the pre-determined threshold is determined as an amount of blocks corresponding to a pre-defined proportion of neighbouring blocks determined to use the intra-block copy prediction mode or palette mode to the total amount of neighbouring blocks.

Desirably the neighbouring blocks are the blocks corresponding to the reference samples.

Preferably the neighbouring blocks are the blocks at least abutting the left and above edges of the coding unit (CU) of the current block. More specifically the neighbouring blocks further include a block abutting a left-top corner of the coding unit (CU) 1301 of the current block.

Desirably the neighbouring blocks are the blocks abutting at least the left and above edges of the coding tree unit (CTU) of the current block. Preferably the neighbouring blocks further includes a block abutting a left-top corner of the coding tree unit (CU) of the current block.

Advantageously the neighbouring blocks are determined according to a pre-defined threshold distance.

According to another aspect of the present disclosure there is provided a method of encoding a current block using intra-prediction, the method comprising:

determining a prediction mode for coding blocks neighbouring the current block;

generating prediction values for edge samples of the decoded block from intra-prediction reference samples of the neighbouring coding blocks by applying an intra-prediction process to the intra-prediction encoded current block if a number of the neighbouring coding blocks determined to use intra-block copy prediction mode or palette mode is greater than or equal to a predetermined threshold;

otherwise generating the prediction values for the edge samples of the decoded block from intra-prediction reference samples of the neighbouring coding blocks by applying a filter to reference samples of the neighbouring blocks; and using the generated prediction values and the determined intra-prediction mode to construct the coding block.

In the various aspects, the filter is preferably an intra-boundary filter.

Other aspects are also disclosed, including encoders and decoders that make use of these methods, and a video coding system that uses the encoders and decoders.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
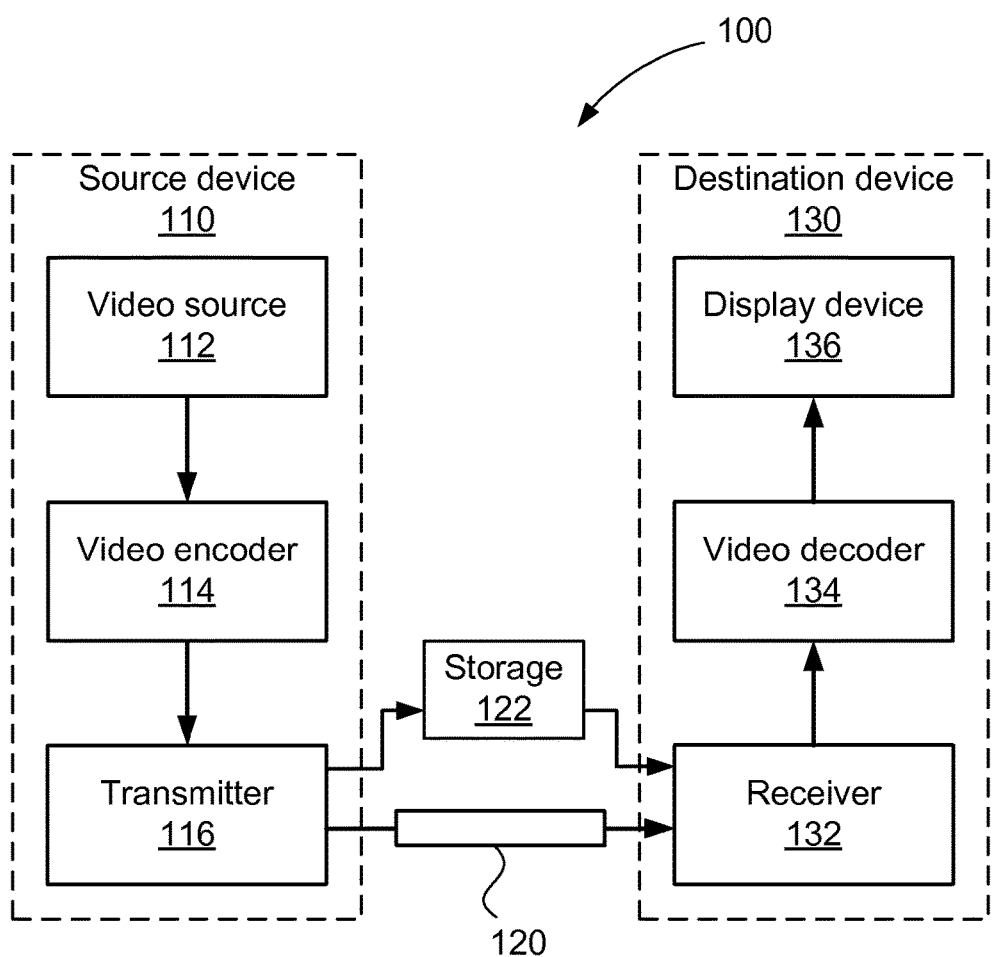
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing function modules of a video encoding and decoding system 100. The system 100 may utilise block prediction methods to improve the subjective and objective video quality in the presence of screen content, i.e. content containing sharp edged information. The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video data is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. The video source 112 may also be the output of a computer graphics card, e.g. displaying the video output of an operating system and various applications executing upon a computing device, for example a tablet computer. Such content is an example of 'screen content'. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically an encoded bitstream and is transmitted by the transmitter 116 over the communication channel 120 as encoded video data (or "encoded video information"). It is also possible for the encoded video data to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
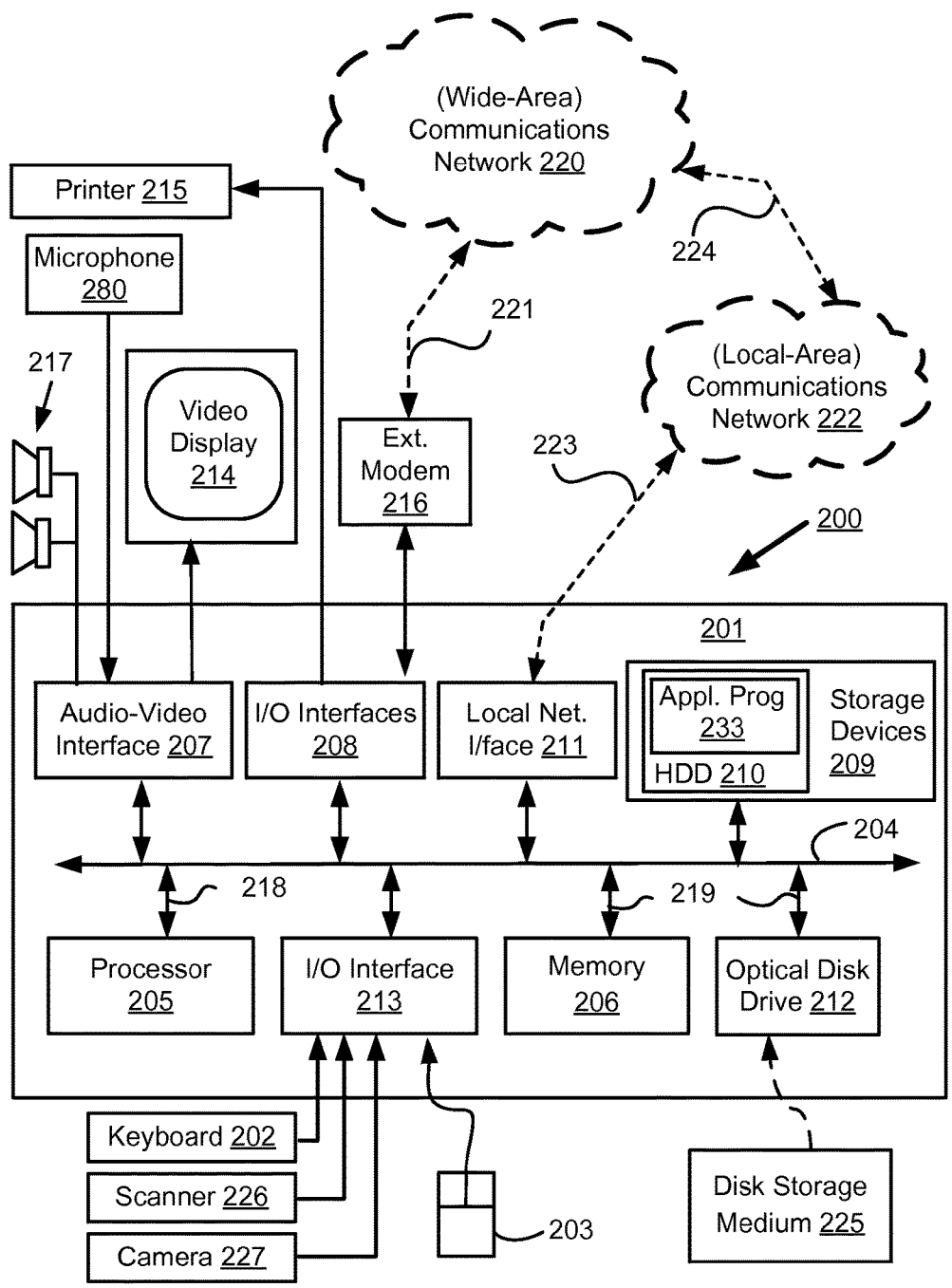
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card and provides an example of 'screen content'. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
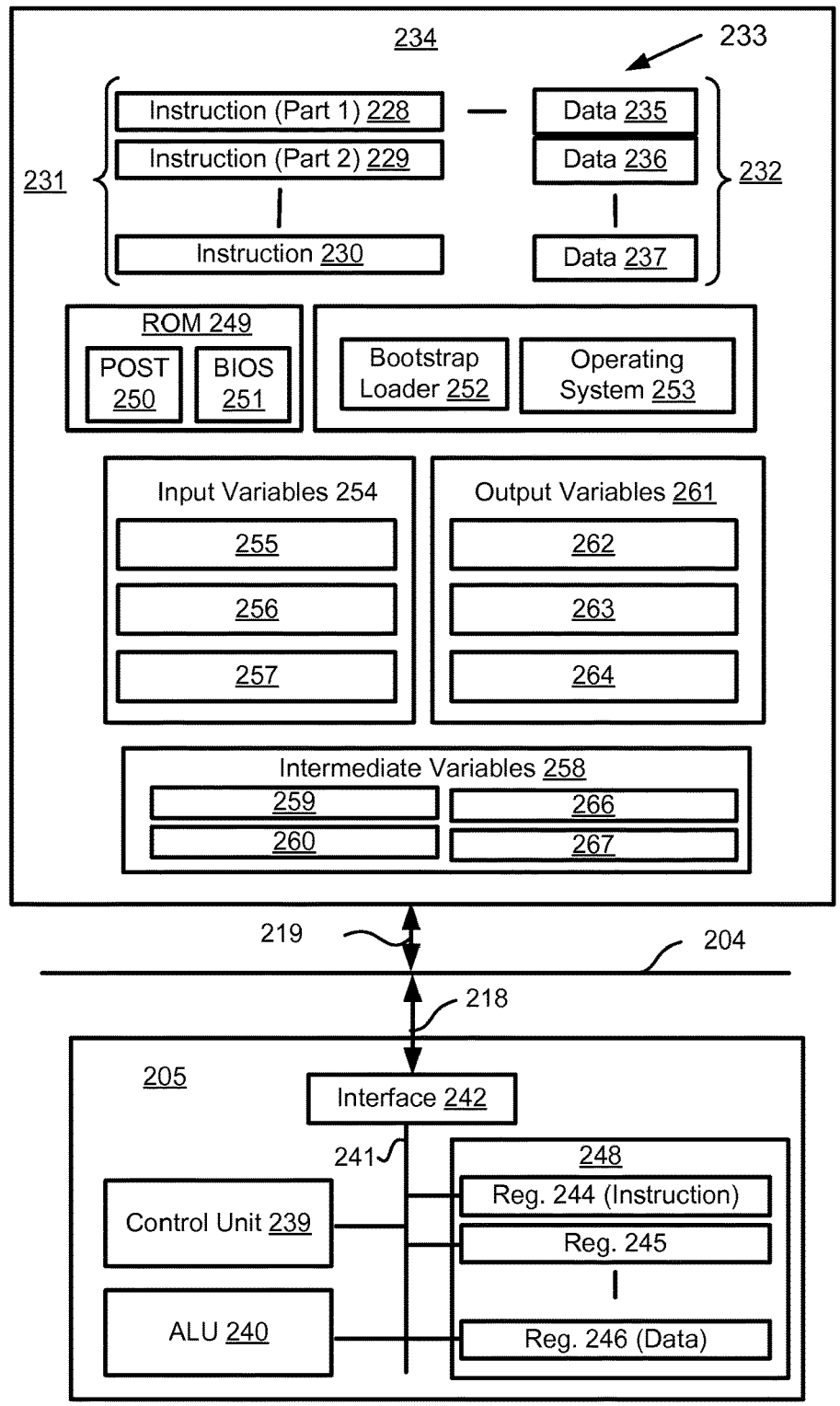

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 11:
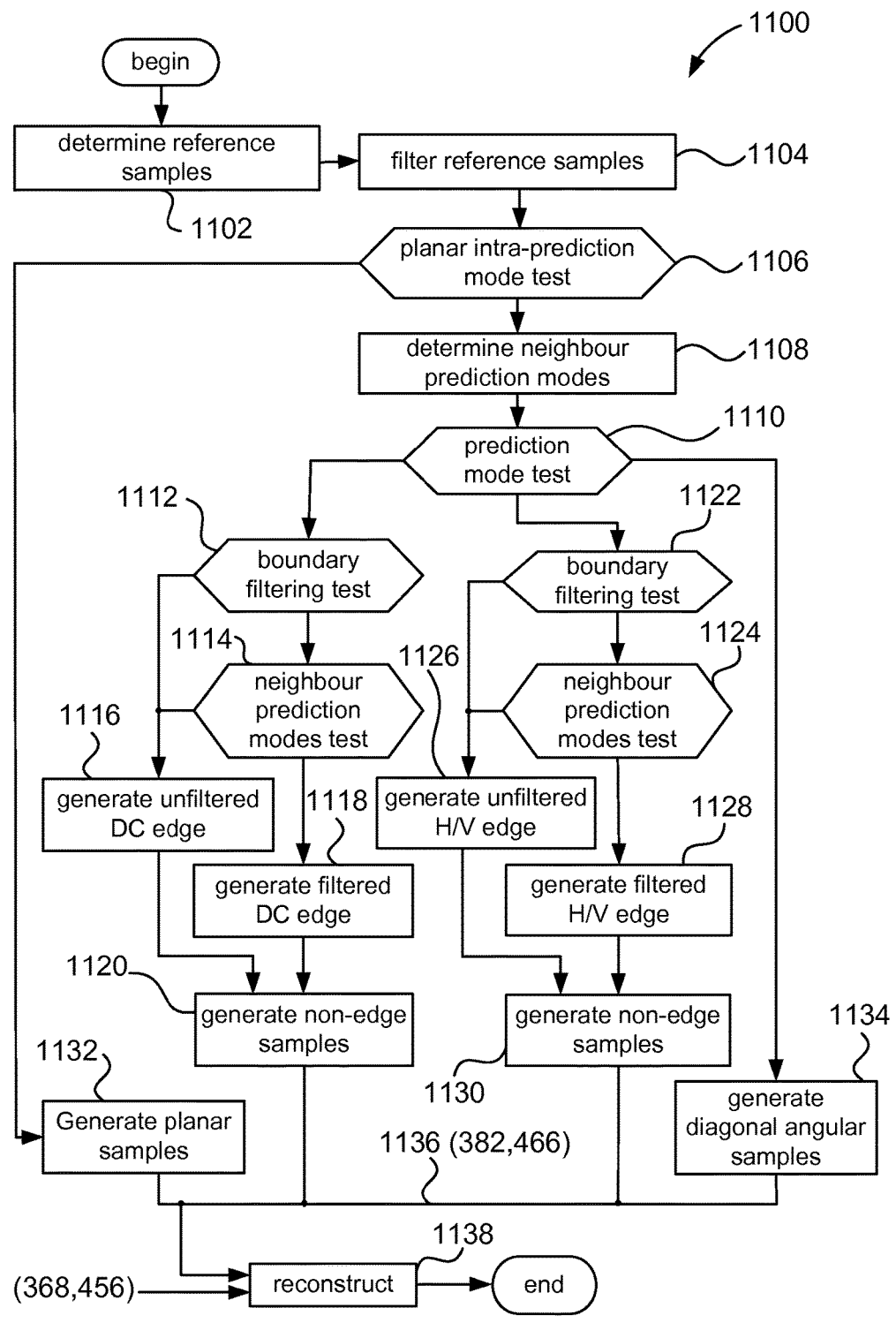
FIG. 11 is a flow chart diagram of an intra-prediction method.

Each step or sub-process in the method of FIG. 11, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
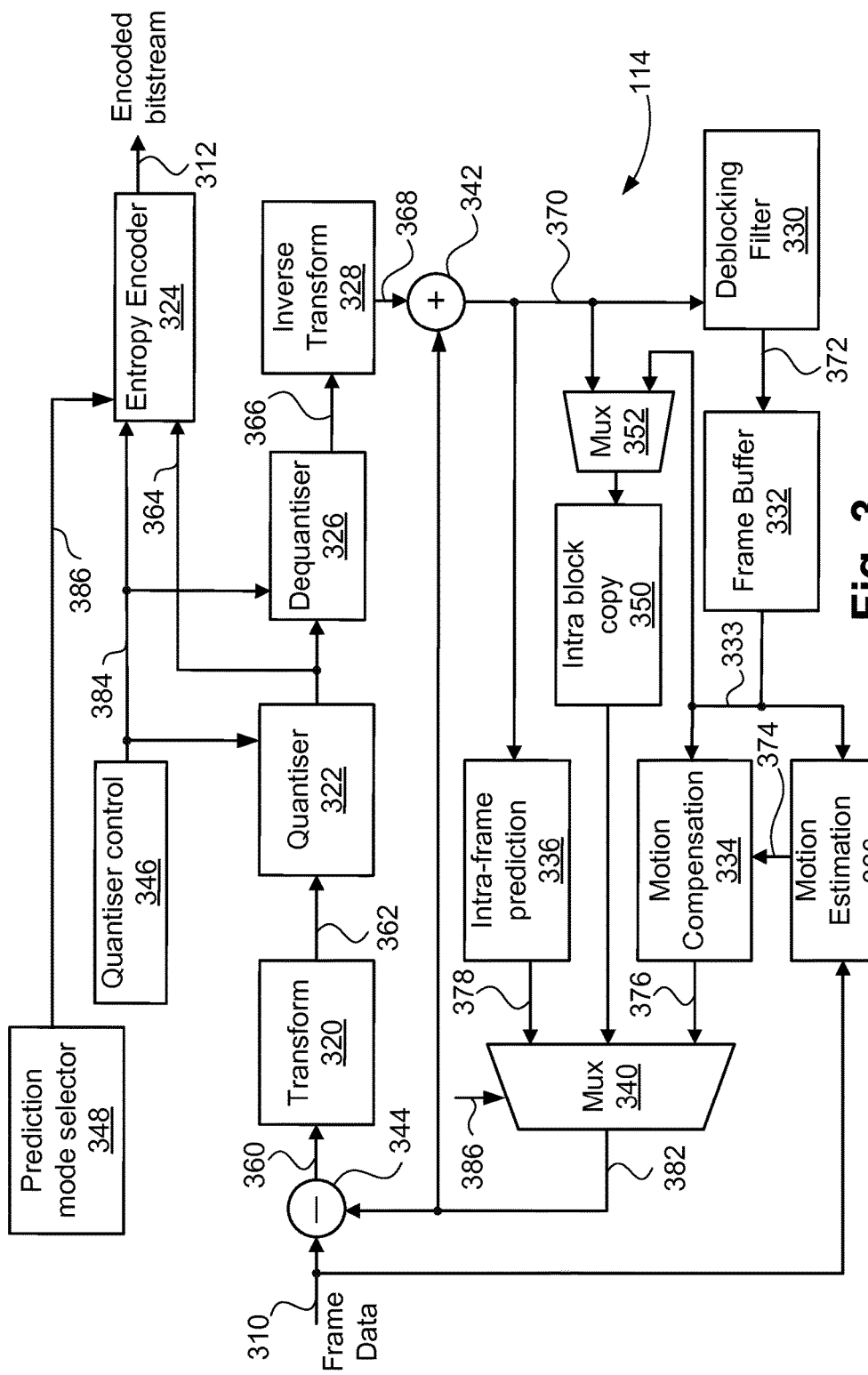
FIG. 3 is a schematic block diagram showing functional modules of a video encoder.
Figure 4:
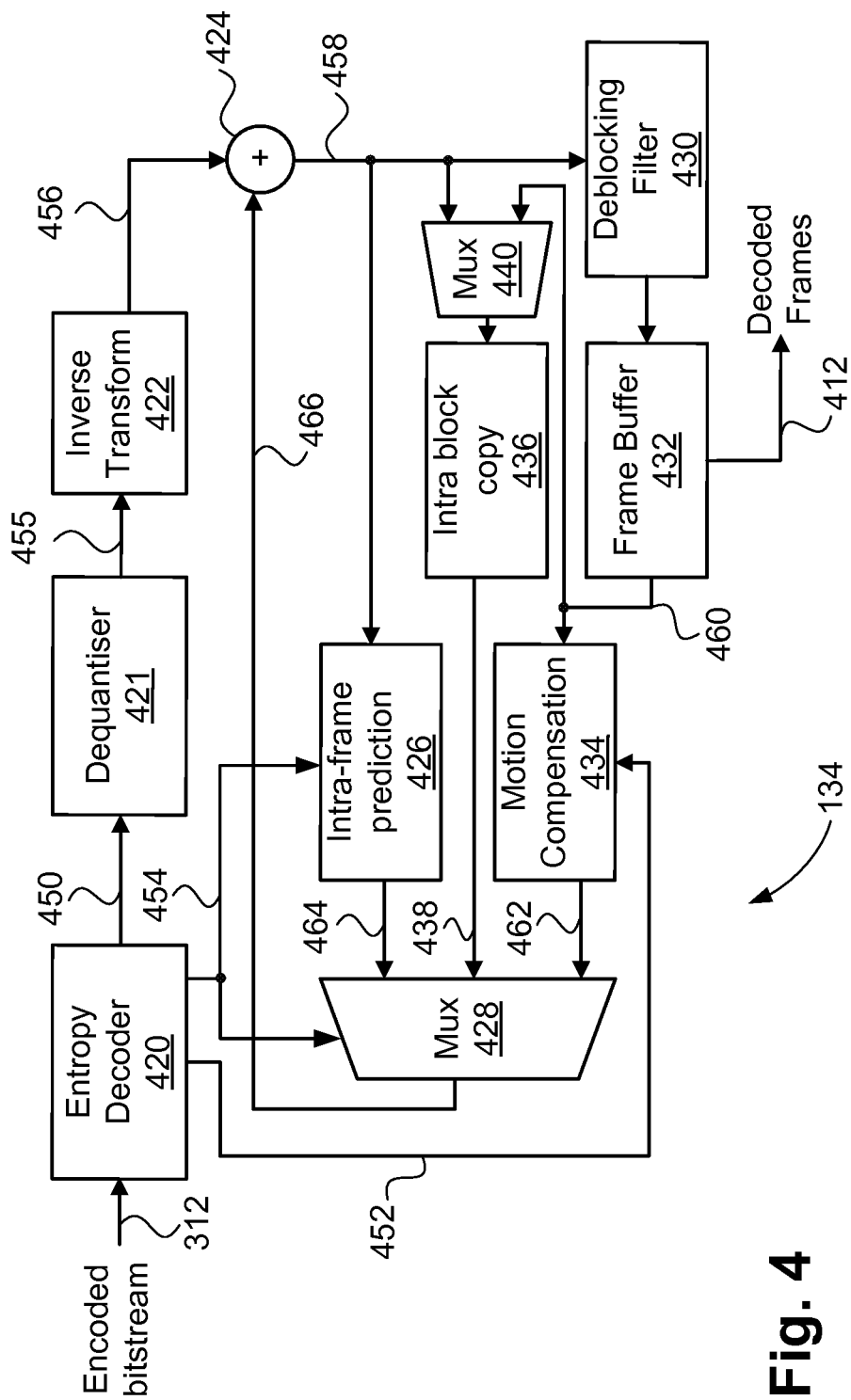
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or transform coefficients), the behaviour shall be understood to be applied to all array elements. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-352 and the video decoder 134 comprises modules 420-440 which may each be implemented as one or more software code modules of the software application program 233.

Although the video encoder 114 of FIG. 3 is an example of a high efficiency video coding (HEVC) video encoding pipeline, other video codecs may also be used to perform the processing stages described herein. The video encoder 114 receives captured frame data, such as a series of frames, each frame including one or more colour channels.

The video encoder 114 divides each frame of the captured frame data, such as frame data 310, into regions generally referred to as 'coding tree units' (CTUs) with side sizes which are powers of two. The coding tree units (CTUs) in a frame are scanned in raster scan order and the sequentially scanned coding tree units (CTUs) are grouped into 'slices'. Generally one slice exists per frame, however a frame may also be divided into multiple slices. Dividing a frame into multiple slices increases signalling overhead but provides error resilience benefits and enables increased parallel processing. The notion of coding tree unit (CTU) refers collectively to all colour channels of the picture. Every coding tree unit (CTU) includes one coding tree blocks (CTBs) for each colour channel. For example in a frame coded using the YCbCr colour space, a coding tree unit (CTU) consists of tree coding tree blocks (CTBs) for Y, Cb and Cr colour planes corresponding to the same spatial location in the picture. The size of individual coding tree blocks (CTBs) may vary across colour components and generally depends on the selected 'chroma format'. For example, in the mode generally known as "4:4:4" chroma format, where all colour components have the same size, the sizes of the coding tree blocks (CTBs) will be the same. In the mode generally known as "4:2:0" chroma format, where chroma components are scaled down by factor of two both horizontally and vertically, the dimensions of chroma coding tree blocks (CTBs) in samples will be halved (both horizontally and vertically) relative to the size of the luma coding tree block (CTB). The size of a coding tree unit (CTU) is specified as the size of the corresponding luma coding tree block (CTB).

The sizes of the chroma coding tree blocks (CTBs) are inferred from the size of the coding tree unit (CTU) and the chroma format.

Each coding tree unit (CTU) includes a hierarchical quad-tree subdivision of a portion of the frame with a collection of 'coding units' (CUs), such that at each leaf node of the hierarchical quad-tree subdivision one coding unit (CU) exists. The subdivision can be continued until the coding units (CU) present at the leaf nodes have reached a specific minimum size. The specific minimum size is referred to as a smallest coding unit (SCU) size. Generally, the smallest coding unit (SCU) size is 8×8 luma samples, but other sizes are also possible, such as 16×16 or 32×32 luma samples. The corresponding coding block (CB) for the luma channel will thus have the same dimensions as the coding unit (CU). The corresponding coding blocks (CBs) for the chroma channels will have dimensions scaled according to the chroma format. If no subdivision of a coding tree unit (CTU) is done and a single coding unit (CU) occupies the whole coding tree unit (CTU) such a coding unit (CU) is referred to as a largest coding unit (LCU) (or maximum coding unit size). Generally the largest coding unit (LCU) size is 64×64, but other sizes are also possible, such as 32×32 and 16×16. These dimensions are also specified in units of luma samples. As a result of the quad-tree hierarchy, the entirety of the coding tree unit (CTU) is occupied by one or more coding units (CUs). The largest coding unit size is signalled in the bitstream for a collection of frames known as a coded video sequence. For a given frame, the largest coding unit (LCU) size and the smallest coding unit (SCU) size do not vary.

The video encoder 114 produces one or more 'prediction units' (PUs) for each coding block (CU). Various arrangements of prediction units (PUs) in each coding unit (CU) are possible and each arrangement of prediction units (PUs) in a coding unit (CU) is referred to as a 'partition mode'. It is a requirement that the prediction units (PUs) do not overlap and that the entirety of the coding unit (CU) is occupied by the one or more prediction units (PUs). Such a requirement ensures that the prediction units (PUs) cover the entire frame area. A partitioning of a coding unit (CU) into prediction units (PUs) implies subdivision of coding blocks (CBs) for each colour component into 'prediction blocks' (PBs). Depending on used chroma format, the sizes of prediction blocks (PBs) corresponding to the same coding unit (CU) for different colour component may differ in size. For coding units (CUs) configured to use intra-prediction, two partition modes are possible, known as 'PART_2N×2N' and 'PART_N×N'. The PART_2N×2N partition mode results in one prediction unit (PU) being associated with the coding unit (CU) and occupying the entirety of the coding unit (CU). The PART_N×N partition mode results in four prediction units (PUs) being associated with the coding unit (CU) and collectively occupying the entirety of the coding unit (CU) by each occupying one quadrant of the coding unit (CU).

The video encoder 114 operates by outputting, from a multiplexer module 340, a prediction unit (PU) 382. When intra-prediction is used, a transform unit (TU)-based reconstruction process is applied. The transform unit (TU)-based reconstruction process results in the prediction unit (PU) 382 being derived on a transform unit (TU) basis. As such, a residual quad-tree decomposition of the coding unit (CU) associated with the prediction unit (PU) indicates the arrangement of transform units (TUs) to be reconstructed to reconstruct the prediction unit (PU) 382. A difference module 344 produces a 'residual sample array' 360. The residual sample array 360 is the difference between the prediction unit (PU) 382 and a corresponding 2D array of data samples from a coding unit (CU) of the coding tree block (CTB) of the frame data 310. The difference is calculated for corresponding samples at each location in the arrays. The residual sample array 360 may be transformed into the frequency domain in a transform module 320. The residual sample array 360 from the difference module 344 is received by the transform module 320, which converts the residual sample array 360 from a spatial representation to a frequency domain representation by applying a 'forward transform'. The transform module 320 creates transform coefficients, according to a transform having a specific precision. The coding unit (CU) is sub-divided into one or more transform units (TUs). The sub-division of the coding unit (CU) into one or more transform units (TUs) is referred to as a 'residual quad-tree' (RQT). Transform unit (TU) boundaries do not cross prediction unit (PU) boundaries. As such, when the coding unit (CU) is configured to use a PART_N×N partition mode, the associated residual quad-tree (RQT) is inferred to have a subdivision at the top level of the hierarchy of subdivisions, ensuring that at least four transform units (TUs) are associated with the coding unit (CU). The notion of transform unit (TU) refers collectively to all colour components. Every transform unit (TU) includes transform blocks (TBs), each transform block (TB) being associated with one colour channel. Depending on the chroma format applied to the picture transform blocks (TBs) for chroma channels may have smaller sizes than a corresponding luma transform block (TB) due to the selected chroma format.

A quantiser control module 346 may test the bit-rate required in the encoded bitstream 312 for various possible quantisation parameter values according to a 'rate-distortion criterion'. The rate-distortion criterion is a measure of the acceptable trade-off between the bit-rate of the encoded bitstream 312, or a local region thereof, and distortion. Distortion is a measure of the difference between frames present in the frame buffer 332 and the captured frame data 310. Distortion may be determined using a peak signal to noise ratio (PSNR) or sum of absolute differences (SAD) metric. In some arrangements of the video encoder 114, the rate-distortion criterion considers only the rate and distortion for the luma colour channel and thus the encoding decision is made based on characteristics of the luma channel. Generally, the residual quad-tree (RQT) is shared between the luma and chroma colour channels, and the amount of chroma information is relatively small compared to luma, so considering luma only in the rate-distortion criterion may be appropriate.

A quantisation parameter 384 is output from the quantiser control module 346. The quantisation parameter 384 may be fixed for a frame of video data, or may vary on a block by block basis as the frame is being encoded. Other methods for controlling the quantisation parameter 384 are also possible. The set of possible transform units (TUs) for a residual quad-tree is dependent on the available transform sizes and coding unit (CU) size. A larger sized transform unit (TU) results in use of larger transforms for both the luma and chroma colour channels. Generally, larger transforms provide a more compact representation of a residual sample array with sample data (or 'residual energy') spread across the residual sample array. Smaller transform units (TUs) provide a more compact representation of a residual sample array with residual energy localised to specific regions of the residual sample array. Thus, the many possible configurations of a residual quad-tree (RQT) provide a useful means for achieving high coding efficiency of the residual sample array 360 in the high efficiency video coding (HEVC) standard.

A prediction mode selector module 348 selects a prediction mode 386 for the current prediction unit (PU). The prediction mode selector module 348 operates by testing multiple prediction modes. For each prediction mode, the cost of coding the mode into the encoded bitstream is traded off against the amount of error of the resulting prediction unit (PU). Generally, the cost of encoding a suitable residual quad-tree (RQT) for the coding unit (CU) is also included in the cost estimation, with a corresponding reduction in the amount of error for the combination of the prediction unit (PU) and one or more associated transform units (TUs).

A 'transform quantisation bypass' mode is provided, where the transform module 320 and a quantisation module 322 are bypassed. The transform quantisation bypass mode is signalled at the coding unit (CU) level using a 'cu_transquant_bypass_flag' syntax element. The transform quantisation bypass mode provides a means to losslessly encode the frame data 310 in the encoded bitstream 312. Use of the transform quantisation bypass mode is controlled at the coding unit (CU) level, allowing portions of the frame data 310 to be losslessly encoded. The availability of the transform quantisation bypass mode is controlled via 'high level syntax', enabling the signalling overhead of controlling transform quantisation bypass mode to be removed in cases where lossless encoding is not required in any portion of the frame data 310. High level syntax refers to portions of the encoded bitstream 312 that are generally encoded infrequently and are used to describe properties of the bitstream (e.g. to restrict or otherwise configure particular coding tools used in the video encoder 114 and the video decoder 134). Examples of high level syntax include 'sequence parameter sets', 'picture parameter sets' and 'slice headers'.

For the high efficiency video coding (HEVC) standard, conversion of the residual sample array 360 to the frequency domain representation is implemented using a transform such as a modified discrete cosine transform (DCT). In such transforms, the modification permits implementation using shifts and additions instead of multiplications. The modifications enable reduced implementation complexity compared to a discrete cosine transform (DCT). In addition to the modified discrete cosine transform (DCT), a modified discrete sine transform (DST) may also be used in specific circumstances. Various sizes of the residual sample array 360 and the scaled transform coefficients 362 are possible, in accordance with supported transform sizes. In the high efficiency video coding (HEVC) standard, transforms are performed on 2D arrays of data samples having the specific sizes of 32×32, 16×16, 8×8 or 4×4. Thus, a predetermined set of transform sizes are available to the video encoder 114 and each transform block (TB) is sized accordingly. The available transform sizes may be further restricted by signalling of a minimum transform size and a maximum transform size in the bitstream. The set of allowable transform sizes is signalled using the 'log 2_min_luma_transform_block_size_minus2' and 'log 2_diff_max_min_luma_transform_block_size' syntax elements in the encoded bitstream 312. Moreover, the set of transform sizes may differ between the luma channel and the chroma channels.

Transforms may be applied to both the luma and chroma channels. Differences between the handling of luma and chroma channels with regard to transform units (TUs) exist. Each residual quad-tree occupies one coding unit (CU) and is defined as a quad-tree decomposition of the coding unit (CU) into a hierarchy including one transform unit (TU) at each leaf node of the residual quad-tree hierarchy. Each transform unit (TU) has dimensions corresponding to one of the supported transform sizes. Similarly to the coding tree unit (CTU), it is necessary for the entirety of the coding unit (CU) to be occupied by one or more transform units (TUs). At each level of the residual quad-tree hierarchy a 'coded block flag' value indicates possible presence of transform blocks in each colour channel. The presence of a transform block at the current hierarchy level is indicated when no further splits in the residual quad-tree (RQT) are present. Otherwise, the presence of transform blocks at lower hierarchy levels is indicated when further splits in the residual quad-tree (RQT) are present. When the coded block flag value is zero, all residual coefficients at the present or lower hierarchy levels are known to be zero. In such a case, no transform is required to be performed for the corresponding colour channel of any transform blocks (TBs) at the present hierarchical level or at lower hierarchical levels. When the coded block flag value is one, if the present region is not further sub-divided then the region contains a transform block (TB) which requires at least one non-zero (i.e. significant) residual coefficient. If the present region is further sub-divided, a coded block flag value of one indicates that each resulting sub-divided region may include non-zero residual coefficients. In this manner, for each colour channel, zero or more transforms blocks (TB) may cover a portion of the area of the coding unit (CU) varying from none up to the entirety of the coding unit (CU). Separate coded block flag values exist for each colour channel.

For a given transform block (TB) with a corresponding coded block flag value of one, the transform may be performed, or the transform may be skipped. In such 'transform skip' blocks, the residual coefficients provide a spatial domain representation. The 'transform skip' mode is generally selected for transform blocks (TBs) in regions of the frame data 310 that contain screen content, as this mode can achieve higher compression efficiency of high frequency (discontinuous tone) information than can be achieved by the modified integer discrete cosine transform (DCT). As the transform skip operation is signalled for each transform block (TB), for a given transform unit (TU), signalling of transform skip is provided independently for each colour channel.

The scaled transform coefficients 362 are input to the quantiser module 322 where data sample values thereof are scaled and quantised, according to a determined quantisation parameter 384, to produce transform coefficients 364. The transform coefficients 364 are an array of values having the same dimensions as the residual sample array 360. The transform coefficients 364 provide a frequency domain representation of the residual sample array 360 when a transform is applied. When the transform is skipped, the transform coefficients 364 provide a spatial domain representation of the residual sample array 360 (i.e. quantised by the quantiser module 322 but not transformed by the transform module 320). For the discrete cosine transform (DCT), the upper-left value of the transform coefficients 364 specifies a 'DC' value for the residual sample array 360 and is known as a 'DC coefficient'. The DC coefficient is representative of the 'average' of the values of the residual sample array 360. Other values in the transform coefficients 364 specify 'AC coefficients' for the residual sample array 360. The scale and quantisation results in a loss of precision, dependent on the value of the determined quantisation parameter 384. A higher value of the determined quantisation parameter 384 results in greater information being lost from the residual data. This results in greater discontinuities along transform block (TB) boundaries. These discontinuities are known as 'blocking artefacts'. The loss of information increases the compression achieved by the video encoder 114, as there is less information to encode. This increase in compression efficiency occurs at the expense of reducing the visual quality of output from the video decoder 134. The determined quantisation parameter 384 may be adapted during encoding of each frame of the frame data 310. Alternatively, the determined quantisation parameter 384 may be fixed for a portion of the frame data 310. In one arrangement, the determined quantisation parameter 384 may be fixed for an entire frame of frame data 310. Other adaptations of the determined quantisation parameter 384 are also possible, such as quantising different residual coefficients with separate values.

The transform coefficients 364 and determined quantisation parameter 384 are taken as input to a dequantiser module 326. The dequantiser module 326 reverses the scaling performed by the quantiser module 322 to produce rescaled transform coefficients 366. The rescaled transform coefficients are rescaled versions of the transform coefficients 364. The transform coefficients 364, the determined quantisation parameter 384 and the prediction mode 386 are also taken as input to an entropy encoder module 324. The entropy encoder module 324 encodes the values of the transform coefficients 364 in the encoded bitstream 312 (or 'video bitstream'). Due to the loss of precision resulting from the operation of the quantiser module 322, the rescaled transform coefficients 366 are not identical to the original values in the scaled transform coefficients 362. The rescaled transform coefficients 366 from the dequantiser module 326 are then output to an inverse transform module 328. The inverse transform module 328 performs an inverse transform from the frequency domain to the spatial domain to produce a spatial-domain representation 368 of the rescaled transform coefficients 366. The spatial-domain representation 368 is substantially identical to a spatial domain representation that is produced at the video decoder 134. The spatial-domain representation 368 is then input to a summation module 342.

A motion estimation module 338 produces motion vectors 374 by comparing the frame data 310 with previous frame data 333 from one or more sets of frames stored in a frame buffer module 332, generally configured within the memory 206. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed to the entropy encoder module 324 for encoding in the encoded bitstream 312. The motion vectors are encoded as 'motion vector differences', i.e. differences between the motion vector for a current block and a neighbouring block. The intra-frame prediction module 336 produces an intra-predicted prediction unit (PU) 378 using reconstructed samples 370 obtained from the summation module 342. In particular, the intra-frame prediction module 336 uses samples from neighbouring blocks that have already been reconstructed to produce intra-predicted samples for the current prediction unit (PU). When a neighbouring block is not available (e.g. at the frame boundary) the neighbouring samples are considered as 'not available' for reference. In such cases, a default value is used instead of the neighbouring sample values. Typically, the default value (or 'halftone') is equal to half of the range implied by the bit-depth. For example, when the video encoder 114 is configured for a bit-depth of eight (8), the default value is 128. The summation module 342 sums the prediction unit (PU) 382 from the multiplexer module 340 and the spatial domain output of the multiplexer 382.

An intra-block copy module 350 tests various block vectors to produce an optimal reference block for the prediction unit (PU) 382, which may be referred to as intra-block copied prediction units. The reference block includes either a block from the reconstructed samples 370 obtained from the current coding tree block (CTB) and/or the previous coding tree block (CTB) or samples from the frame buffer 332. A multiplexor 352 selects between the block of reconstructed samples 370 and the samples from the frame buffer 332 based on a provided block vector. The reference block cannot include samples from any coding blocks (CBs) in the current coding tree block (CTB) that have not yet been reconstructed (and hence are not available in the reconstructed samples 370). A block vector is a two-dimensional vector specifying the location of a reference block relative to the location of the currently considered prediction unit (PU). The block vector includes a horizontal component (i.e. 'X component') and a vertical component (i.e. 'Y component'). The intra-block copy module 350 may test every valid block vector by conducting a search using a nested loop. Faster searching methods are also possible. The intra-block copy module 350 may reduce the search complexity by only searching for block vectors aligned horizontally or vertically to the current coding block (CU), near-horizontal and near-vertical block vectors may also be searched. The intra-block copy module 350 may test a spatially sparse set of block vectors and then perform a refined search in the neighbourhood of the optimal one of the sparse block vectors to produce a final block vector.

Prediction units (PUs) may be generated using either an intra-prediction, an inter-prediction, an intra-block copy method or using palette prediction. Intra-prediction methods make use of data samples adjacent to the prediction unit (PU) that have previously been decoded (typically above and to the left of the prediction unit) in order to generate reference data samples within the prediction unit (PU). Thirty-three angular intra-prediction modes are available. Additionally, a 'DC mode' and a 'planar mode' are also available for intra-prediction, to give a total of thirty-five (35) available intra-prediction modes. An intra-prediction mode 388 indicates which one of the thirty-five available intra-prediction modes is selected for the current prediction unit (PU) when the prediction unit (PU) is configured to use intra-prediction (i.e. as indicated by the prediction mode 386). Inter-prediction methods make use of a motion vector to refer to a block from a selected reference frame. The motion estimation module 338 and motion compensation module 334 operate on motion vectors 374, having a precision of one quarter (¼) of a luma sample, enabling precise modelling of motion between frames in the frame data 310. Intra-block copy methods make use of a block vector to reference a block of samples from samples that have previously been decoded in the current frame. Block vectors are defined at integer pixel precision. Palette prediction populates a prediction unit (PU) with samples obtained from a 'palette' using a series of 'run' operations and 'copy' operations. A run operation populates the prediction unit (PU) in raster scan order using a colour available in the palette. A copy operation populates the prediction unit (PU) in raster scan order by copying a value from neighbouring samples in the prediction unit (PU) to the current sample. The entirety of the prediction unit (PU) is populated in raster scan order using a combinations of run and copy operations. The ability to specify prediction unit (PU) contents with high precision from a palette of colours makes the palette prediction mode highly beneficial for screen content.

The decision on which of the intra-prediction, the inter-prediction, the intra-block copy or the palette prediction method to use is made according to a rate-distortion trade-off. The trade-off is made between the desired bit-rate of the resulting encoded bitstream 312 and the amount of image quality distortion introduced by the prediction method. If intra-prediction is used, one intra-prediction mode is selected from the set of possible intra-prediction modes, also according to a rate-distortion trade-off. The multiplexer module 340 may select either the intra-predicted reference samples 378 from the intra-frame prediction module 336, or the inter-predicted prediction unit (PU) 376 from the motion compensation block 334, or intra-block copied samples from the intra-block copy module 350 or palette predicted samples from a palette prediction module (not shown in FIG. 3). The multiplexor module 340 performs the selection according to the prediction mode 386 obtained from the prediction mode selector 348, discussed above.

The summation module 342 produces the reconstructed samples 370 that are input to a de-blocking filter module 330. The de-blocking filter module 330 performs filtering along block boundaries, producing de-blocked samples 372 that are written to the frame buffer module 332 configured within the memory 206. The frame buffer module 332 is a buffer with sufficient capacity to hold data from one or more past frames for future reference as part of a reference picture list.

The entropy encoder 324 encodes the transform coefficients 364, the prediction mode 386, the intra-prediction mode 388, the motion vectors (or motion vector differences) and other parameters, collectively referred to as 'syntax elements', into the encoded bitstream 312 by performing a context adaptive binary arithmetic coding (CABAC) algorithm. Syntax elements are grouped together into 'syntax structures'. The groupings may contain recursion to describe hierarchical structures. In addition to ordinal values, such as the intra-prediction mode 388 or integer values, such as a motion vector, syntax elements also include flags, such as to indicate a quad-tree split.

Although the video decoder 134 of FIG. 4 is described with reference to a high efficiency video coding (HEVC) video decoding pipeline, other video codecs may also employ the processing stages of modules 420-440. The encoded video information may also be read from memory 206, the hard disk drive 210, a CD-ROM, a Blu-ray Disk™ or other computer readable storage medium. Alternatively the encoded video information may be received from an external source, such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-ray Disk™ or other non-transitory computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual data array 450, motion vectors 452 (motion vector differences are decoded from the encoded bitstream 312 and from these, the motion vectors 452 are derived), a prediction mode 454 and an intra-prediction mode 457. The residual data array 450 is passed to a dequantiser module 421, the motion vectors 452 are passed to a motion compensation module 434, the intra-prediction mode 457 is passed to an intra-frame prediction module 426 and the prediction mode 454 is passed to a multiplexer 428.

The dequantiser module 421 performs inverse scaling on the residual data of the residual data array 450 to create reconstructed data 455 in the form of transform coefficients. The dequantiser module 421 outputs the reconstructed data 455 to an inverse transform module 422. The inverse transform module 422 applies an 'inverse transform' to convert the reconstructed data 455 (i.e., the transform coefficients) from a frequency domain representation to a spatial domain representation, outputting a residual sample array 456 via a multiplexer module 423. The inverse transform module 422 performs the same operation as the inverse transform module 328. The inverse transform module 422 is configured to perform an inverse transform. The transforms performed by the inverse transform module 422 are selected from a predetermined set of transform sizes required to decode an encoded bitstream 312 that is compliant with the high efficiency video coding (HEVC) standard.

The motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU). The inter-prediction prediction unit (PU) 462 is a prediction of output decoded frame data based upon previously decoded frame data. When the prediction mode 454 indicates that the current prediction unit (PU) was coded using intra-prediction, the intra-frame prediction module 426 produces an intra-predicted prediction unit (PU) 464 for the prediction unit (PU) according to the intra-prediction mode 457. The intra-predicted prediction unit (PU) 464 is produced using data samples spatially neighbouring the prediction unit (PU) and a prediction direction also supplied by the intra-prediction mode 457. The spatially neighbouring data samples are obtained from reconstructed samples 458, output from a summation module 424. An intra-block copy module 436 produces a block of reference samples 438, by using a multiplexor 440 to copy an array of samples from either the current and/or the previous coding tree blocks (CTBs) or from the frame buffer 432. The offset of the reference samples is calculated by adding a block vector (decoded by the entropy decoder 420) to the location of the current coding block (CB) within the current coding tree block (CTB). For block vectors indicating a reference block located outside of the current and previous coding tree block (CTB), the multiplexor 440 selects samples from the frame buffer 432, otherwise the multiplexor selects samples from the reconstructed samples 458. The multiplexer module 428 selects the intra-predicted prediction unit (PU) 464 or the inter-predicted prediction unit (PU) 462 for a prediction unit (PU) 466 or a reference block 438 from the intra-block copy module 436, or a palette prediction from a palette prediction module (not shown in FIG. 4), depending on the current prediction mode 454. The prediction unit (PU) 466, which is output from the multiplexer module 428, is added to the residual sample array 456 from the inverse scale and transform module 422 by the summation module 424 to produce reconstructed samples 458. The reconstructed samples 458 is then input to each of a de-blocking filter module 430, the intra-frame prediction module 426 and the intra-block copy module 436. The de-blocking filter module 430 performs filtering along data block boundaries, such as transform unit (TU) boundaries, to smooth visible artefacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

Figure 5:
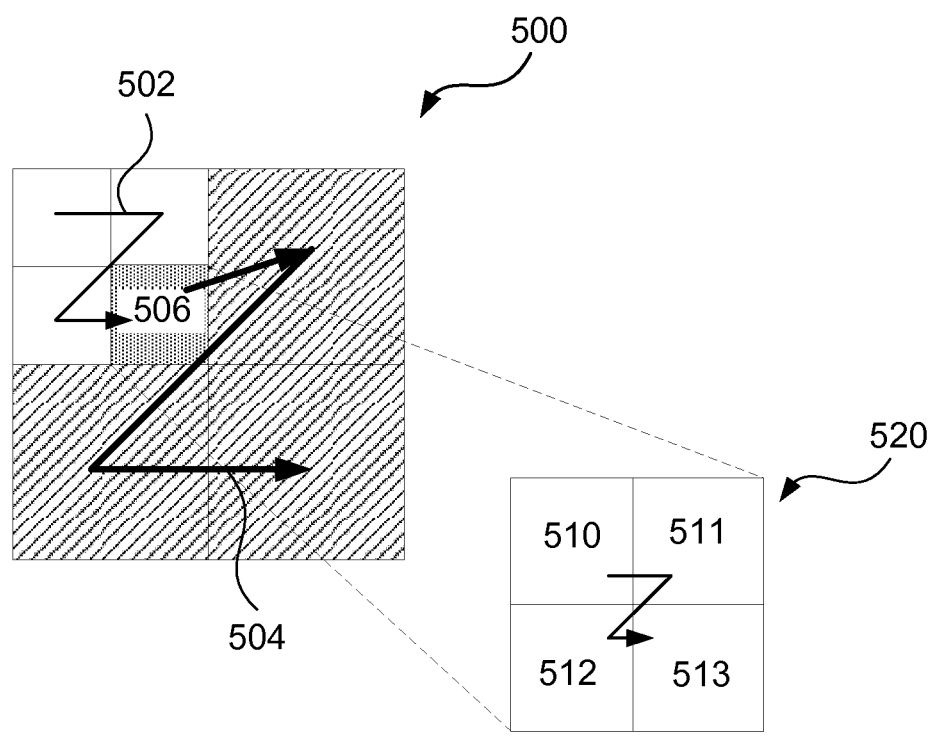
FIG. 5 is a schematic block diagram showing an example 'Z scan order' for scanning coding blocks (CBs) within a coding tree block (CTB)

FIG. 5 is a schematic block diagram showing an example of the 'Z-scan order' used for scanning coding blocks (CBs) within a coding tree block (CTB) 500. At each level of a hierarchical decomposition of the coding tree block (CTB) 500, a scan resembling a 'Z' is performed, i.e. from left to right, repeated for the top and bottom pairs of blocks. Within each block, the Z scan order is performed recursively in a depth-first manner. In the example of FIG. 5, four coding blocks (CBs) in a top-left of the coding tree block (CTB) 500 are scanned in a Z scan order (e.g. 502), reaching a coding block (CB) 506 that is currently being processed in the example of FIG. 5. The remainder of the coding tree block (CTB) 500 is scanned according to Z scan order 504. The samples from previously reconstructed coding blocks (CBs) in the coding tree block (CTB) 500 are available for intra-prediction. The samples from the coding blocks (CBs) that have not yet been reconstructed by the video decoder 134 are not available for intra-prediction and are illustrated with diagonal hatching in FIG. 5. As such, the video encoder 114 also treats the samples from the coding blocks (CBs) that have not yet been reconstructed as not being available for intra-block copy.

In the example of FIG. 5, the residual quad-tree (RQT) 520 associated with the coding block (CB) 506 results in a split into four (4) transform blocks (TBs) 510-513. The transform blocks (TBs) 510-513 are also reconstructed in the 'Z scan order'. Accordingly, after each transform block (TBs), such as transform block (TB) 510, has been reconstructed, the reconstructed transform block (TB) is available for reference in the intra-prediction process of subsequent transform blocks (TBs). The spatial proximity of the samples available for reference generally results in a prediction unit (PU) that is a close match to the original frame data 310. The transform unit (TU)-based reconstruction process improves coding efficiency as the residual associated with each transform unit (TU) is included in the reference samples used to produce prediction samples for subsequent transform units (TUs). Thus, in the example of FIG. 5, reconstructed samples associated with the transform block (TB) 510 are used in the intra-prediction process of transform blocks (TBs) 511-513, and reconstructed samples associated with the transform blocks (TBs) 510-512 are used in the intra-prediction process of the transform block (TB) 513.

Figure 6:
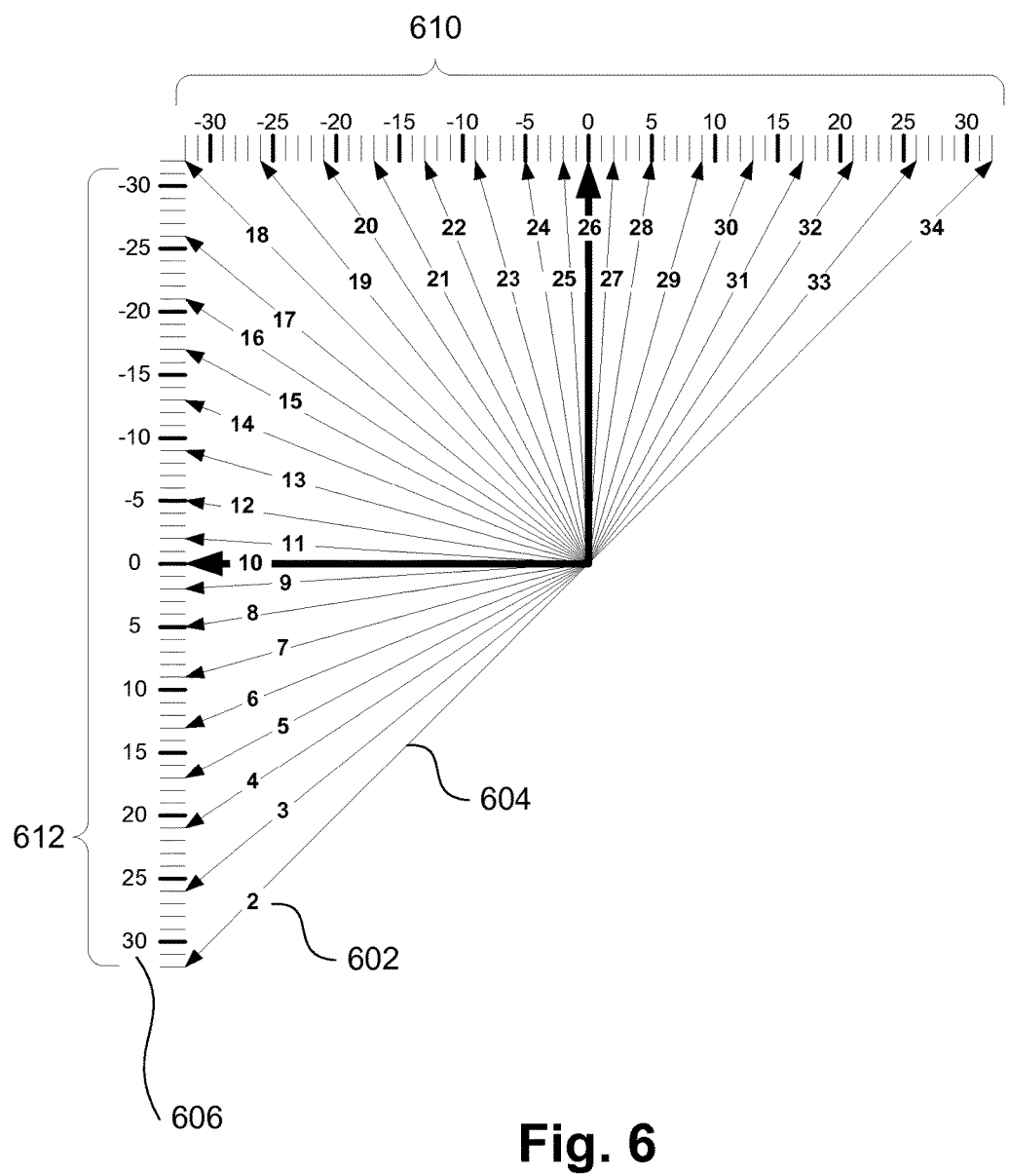
FIG. 6 is a schematic illustration of all directional intra-prediction modes used by the high efficiency video coding (HEVC) standard.

FIG. 6 schematically illustrates the thirty three angular intra-prediction modes present in the high efficiency video coding (HEVC) standard, each providing intra-prediction in a unique 'direction'. The thirty-three available intra-prediction directions are each illustrated in FIG. 6 using an arrow and are numbered from two (2) to thirty-four (34). The numbering of '2' to '34' corresponds to the angular intra-prediction modes. For example, mode '2' (also labelled as 602) corresponds to intra-prediction direction 604. Intra-prediction modes zero (0) and one (1) indicate the DC and planar modes respectively, as discussed above, and are not shown in FIG. 6. The angular mode 10 corresponds to horizontal intra-prediction and the angular mode 26 corresponds to vertical intra-prediction. The intra-prediction process for angular modes populates a transform block (TB) using neighbouring reconstructed samples. The arrows shown in FIG. 6 for angular intra-prediction modes '2' to '34' show directions emanating from a central point. The actual 'direction' in which neighbouring samples populate the transform block (TB), the actual 'direction' of intra-prediction is opposite, i.e. one-hundred and eighty (180) degrees rotated, from the direction illustrated in FIG. 6. Thus, the angular intra-prediction process populates a transform block (TB) with reconstructed samples obtained from the left of and above the current transform block (TB). Due to application of the Z scan order, samples located to the right of and below the current transform block (TB) are not yet reconstructed.

Figure 7:
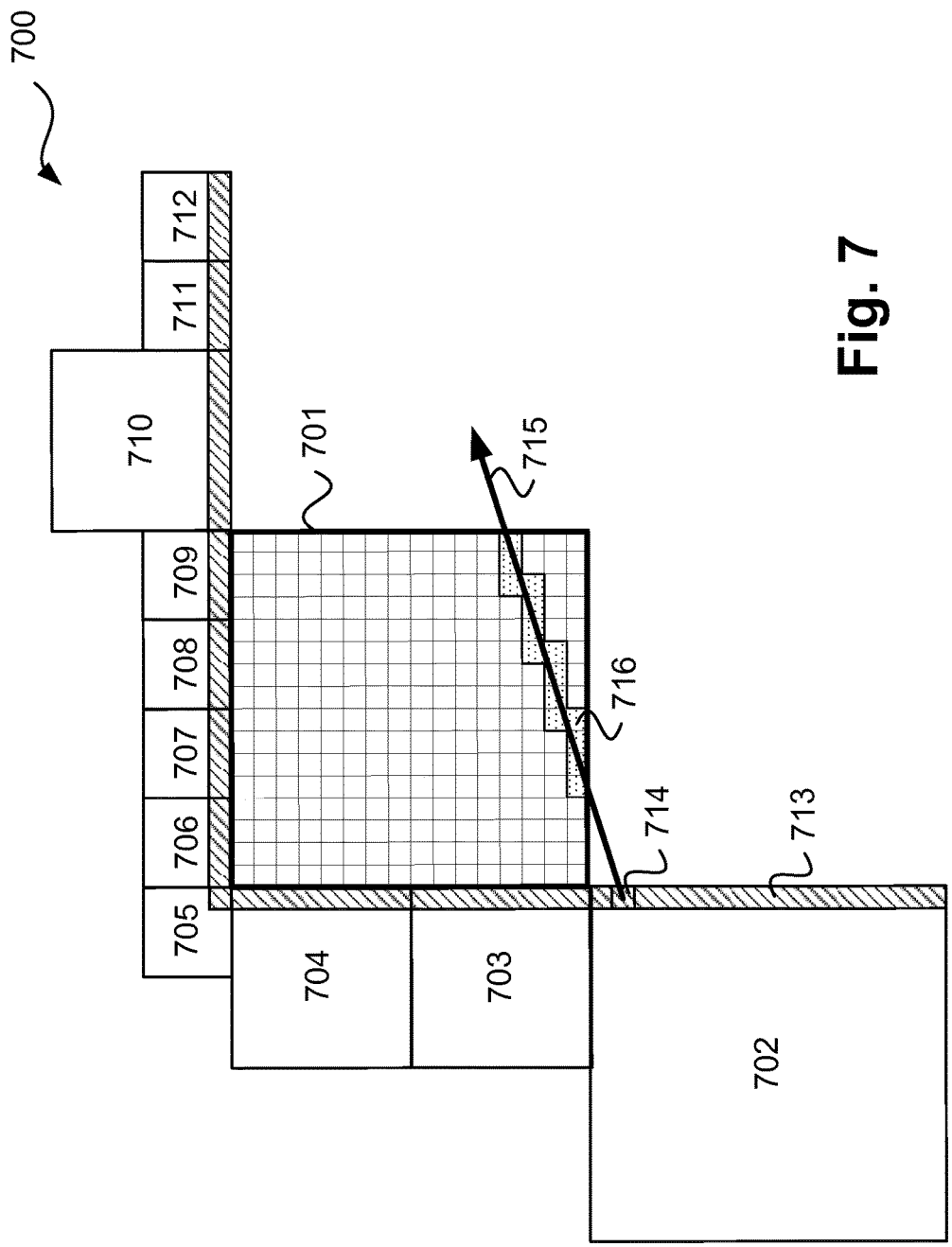
FIG. 7 is an example configuration of a transform block (TB) predicted using an intra-prediction mode.

FIG. 7 shows an exemplary configuration of transform blocks (TBs) 701-712 to illustrate the intra-prediction process. The transform blocks (TBs) 701, 702 each have a size of 16×16 samples, the transform blocks (TBs) 703, 704, 710 each have a size of 8×8 samples and the transform bocks 705-709, 711, 712 each have a size of 4×4 samples. Different configurations are also possible, with transform blocks (TBs) each having the following sizes: 4×4, 8×8, 16×16 or 32×32. Each transform block (TB) is associated with a coding unit (CU) configured to use a particular prediction mode. The transform block (TB) 701 is associated with a coding unit (CU) configured to use intra-prediction. Reference samples 713, shown using up-right hatching, are a set of reconstructed samples belonging to neighbouring transform blocks (TBs) 702-712. The reference samples 713 are used to derive prediction samples associated with the transform block (TB) 701. The reference samples 713 include a 'below-left' section, a 'left' section, an 'above-left' section, an 'above' section, and an 'above-right' section. In the example of FIG. 7, the below-left section of the reference samples 713 are obtained from the transform block (TB) 702, the left section of the reference samples 713 are obtained from the transform blocks (TBs) 703, 704 abutting the left edge of the block 701, the above-left section of the reference samples 713 is obtained from the transform blocks (TB) 705 abutting the left-top corner of the block 701, the above section of the reference samples 713 is obtained from the transform blocks (TBs) 705-709, abutting the top edge of the block 701 and the above-right section of the reference samples 713 is obtained from the transform blocks (TBs) 710-712. The number of samples in the reference samples 713 is equal to 4*nT+1 where nT is the side dimension of the transform block, i.e. 16 in the case of the 16×16 transform block (TB) 701. The reference samples 713 are obtained from the reconstructed samples 370 in the video encoder 114 or the reconstructed samples 458 in the video decoder 134 and consist of previously reconstructed samples. For a given transform block (TB), not all sections of the reference samples 713 are always available. For example, for a transform unit (TU) located along the bottom of a given coding tree unit (CTU), the below-left section of the reference samples 713 is not available because this section is located in the next row of coding tree units (CTUs). For any section of the reference samples 713 that is not available, a default value is used for the corresponding samples. The default sample value may be determined from available neighbouring sample(s) or may be a constant value.

FIG. 7 also illustrates an example of an angular intra-prediction mode. Samples 716, shown as dotted samples of the transform block (TB) 701, are populated with a value derived predominantly from the sample 714 located in the reference samples 713. The relationship between the sample 714 in the reference samples 713, and the samples 716 to be populated in the transform block (TB) 701, is shown as an intra-prediction direction 715. The entirety of the transform unit (TU) is thus populated by the intra-frame prediction module 336 in the video encoder 114 or the intra-frame prediction module 426 in the video decoder 134 in accordance with the selected intra-prediction mode. The video encoder 114 determines the intra-prediction mode 388 using an optimization criteria, such as rate-distortion optimization, and encodes the intra-prediction mode 388 that is selected in the encoded bitstream 312 using the entropy encoder 324. The video decoder 134 decodes the selected intra-prediction mode from the encoded bitstream 312 using the entropy decoder 420.

The transform blocks (TBs) 701-712 are associated with one coding unit (CU) configured to use intra-prediction and are associated with the prediction units (PUs) of the coding unit (CU) in multiple possible ways. One possibility is that the coding unit (CU) is configured to use a PART_NxN partition mode, in which case there are four prediction units (PUs) associated with the coding unit (CU) and at least four transform units (TUs) are also associated with the coding unit (CU). In this case, the intra-prediction mode of each prediction unit (PU) is independently signalled in the encoded bitstream 312. Another possibility is that the coding unit (CU) is configured to use a PART_2Nx2N partition mode and a split transform flag associated with the coding unit (CU) indicates the residual quad-tree (RQT) has a split into four transform units (TUs). Additional splitting of each quadrant of the residual quad-tree (RQT) into further sets of four quadrants is also possible, providing that the resulting transform blocks (TBs) are not smaller than the minimum supported transform size (i.e. 4x4). In such a case, a single prediction unit (PU) is associated with the coding unit, and thus a single intra-prediction mode is signalled in the encoded bitstream 312. However, due to the split, the reconstruction process determines an array of prediction samples for each transform unit (TU) associated with the coding unit (CU) using the intra-prediction mode of the prediction unit (PU) in each case, i.e. the same intra-prediction mode.

Figure 8:
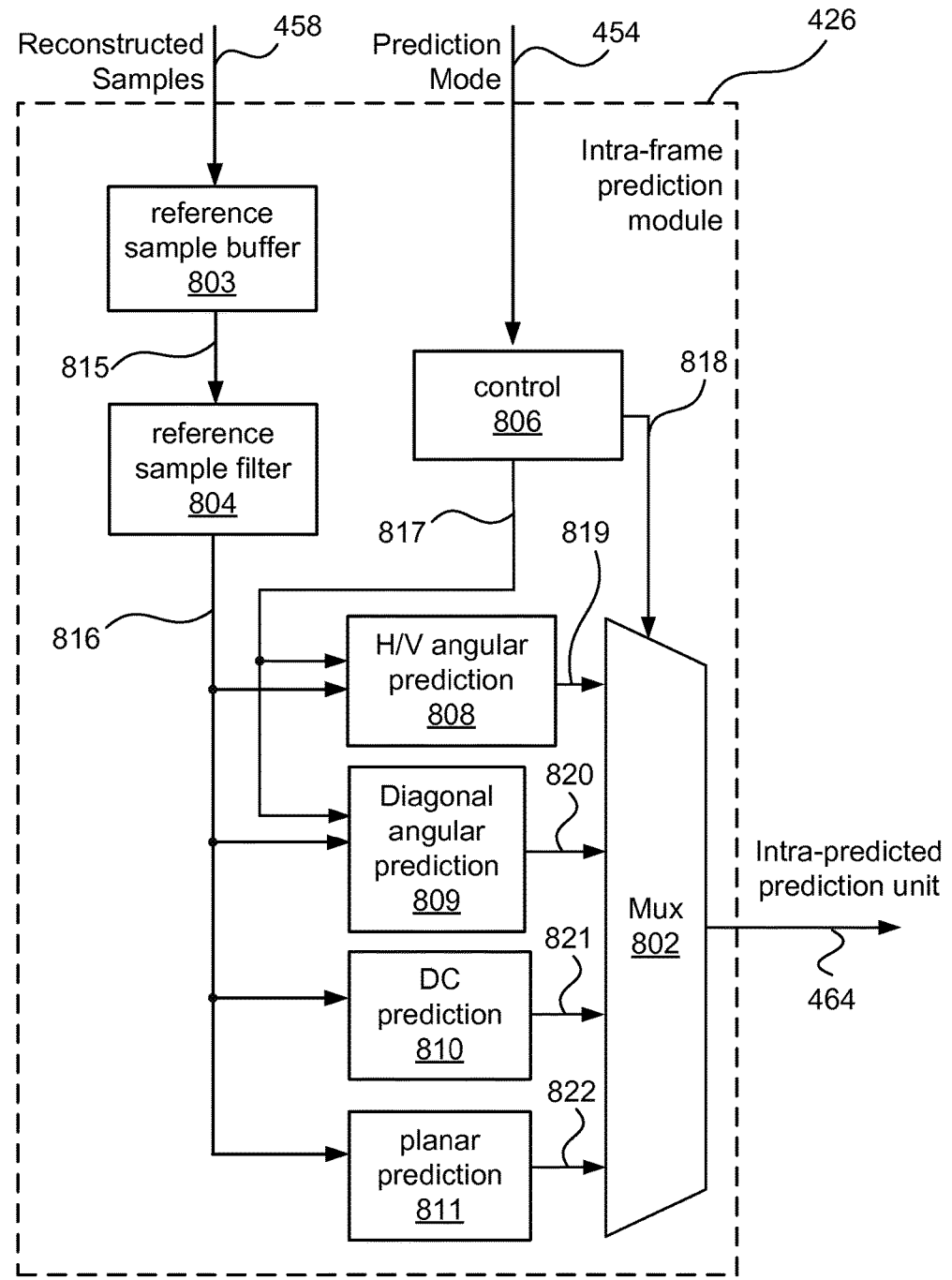
FIG. 8 is a schematic block diagram of an intra-prediction module.

FIG. 8 is a schematic block diagram showing modules present within the intra-frame prediction module 426 of the video decoder 134. The intra-frame prediction module 336 of the video encoder 114 has the same functionality as the intra-frame prediction module 426 of the video decoder 134 excepting that with the intra-frame prediction module 336, such does not receive a selectable prediction mode (386), rather the prediction mode 386 is used in the encoder 134 to control the multiplexer 340 to select the required prediction mode for encoding. As seen in FIG. 8 in respect of the decoder 134, a reference sample buffer 803 holds reference samples (e.g. 713) 815, received from reconstructed samples 458 of neighbouring transform blocks (TBs) output from the summation module 424. Where reconstructed samples are not available for a portion of the reference samples, the corresponding samples in the reference sample buffer 803 are populated with a default value. The default value may be derived from available samples or may be a pre-defined constant. An intra-reference filter module 804 receives reference samples 815 from the reference sample buffer 803 and applies a smoothing filter to produced filtered reference samples 816. The filtered reference samples 816 are input to prediction modules including a non-diagonal (H/V) angular prediction module 808, a diagonal angular prediction module 809, a DC prediction module 810 and a planar prediction module 811. A control module 806 controls operation of the angular prediction modules 808-809 and a multiplexer module 802. The control module 806 receives the intra-prediction mode value 454 from the entropy decoder 420. When the intra-prediction mode value 454 indicates an angular prediction mode (modes two (2) to thirty-four (34)), the control module 806 derives a prediction angle 817 that corresponds to a given prediction mode and passes the derived prediction angle 817 to the angular prediction modules 808 and 809. The multiplexer module 802 receives an intra-prediction mode selection signal 818 from the control module 806 based on the prediction mode 454 to select and output an array of predicted samples, corresponding to a current transform block (TB) under reconstruction in the transform unit (TU)-based reconstruction process. As each transform block (TB) within a prediction block (PB) is iterated over, the full set of prediction samples for the prediction block (PB) is produced. A further iteration over each colour channel results in the full set of prediction samples for the prediction unit (PU) being produced.

The method for building textures for horizontal and vertical prediction angles, i.e. modes ten (10) and twenty-six (26), are performed in the non-diagonal (H/V) angular mode module 808 and differs from the method for building prediction textures for other angles, i.e. modes two (2) to nine (9), eleven (11) to twenty-five (25) and twenty-seven (27) to thirty-four (34), which are performed in the diagonal angular mode module 809. Although the methods may be combined into a single module, they are described separately for clarity.

The non-diagonal angular mode module 808 produces prediction samples for exactly horizontal (i.e. intra-prediction mode 10) and exactly vertical prediction modes (i.e. intra-prediction mode 26) using the filtered reference samples 816 from the reference sample filter module 804. Output of the non-diagonal angular mode module 808 is a horizontal or vertical prediction texture 819.

The diagonal angular mode module 809 produces prediction samples for diagonal angular intra-prediction modes using the filtered reference samples from the reference sample filter module 804 and the prediction angle from the control module 806. Output of the module 809 is an angular prediction texture 820.

The DC prediction module 810 produces prediction samples for the DC prediction mode using the filtered reference samples from the reference sample filter module 804. Output of the module 810 is a DC prediction texture 821.

The planar prediction module 811 produces prediction samples for the planar prediction mode using the filtered reference samples from the filter 804. Output of the module 811 is a planar prediction texture 822.

Prediction samples from the modules 808-811 are passed to the multiplexer module 802. The multiplexer module 802 selects one of the sets of prediction samples in accordance with the intra-prediction mode selection signal 818 from the controller 806. The multiplexer module 802 outputs the selected set of prediction samples, being an intra-predicted prediction unit, as the output 464 of the intra-frame prediction module 426.

Methods for producing prediction textures, for horizontal (mode number ten (10)), vertical (mode number twenty-six (26)) and DC intra-prediction modes, may apply an 'intra-boundary filter' to control the generation of a subset of the predicted samples. Such methods will be described below with reference to FIGS. 9, 10 and 11. In particular, advantageous conditions for application of the intra-boundary filter are described.

Figure 9:
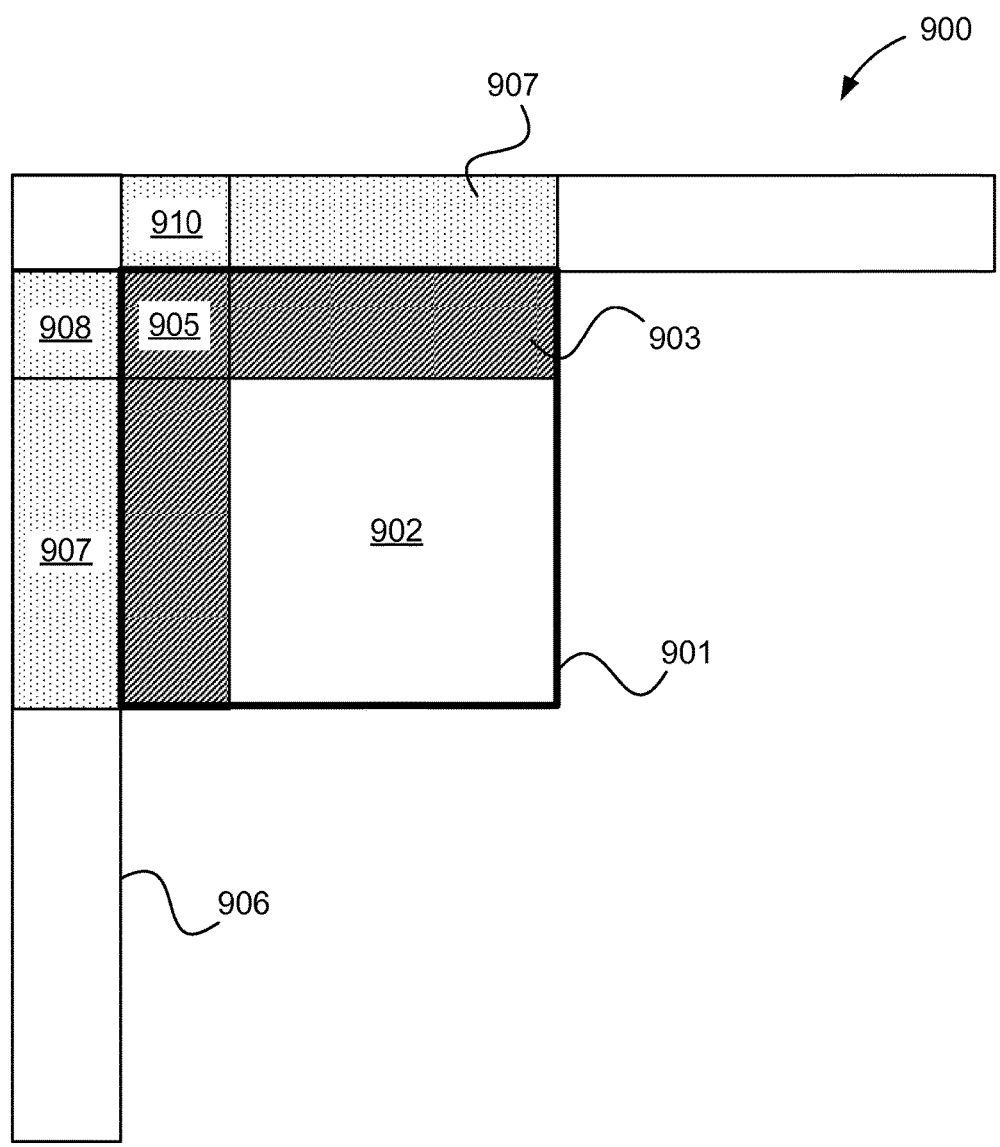
FIG. 9 shows a transform block (TB) associated with a prediction block (PB) that uses a DC mode of intra-prediction.

FIG. 9 is a schematic representation showing a transform block (TB) 901 being predicted with the DC intra-prediction mode. A value dcVal, is derived from neighbouring reference samples 906 according to the HEVC standard. The transform block (TB) 901 includes two regions; an edge region 903 (illustrated in FIG. 9 with up-right hatching) and a non-edge region 902. Samples in the non-edge region 902 are populated with dcVal. When the 'intra-boundary filter' is applied, samples in the edge region 903 are populated in accordance with a rule to be described in the step 1118 of FIG. 11. When the intra-boundary filter is not applied, samples in the edge region 903 are populated with dcVal.

Figure 10:
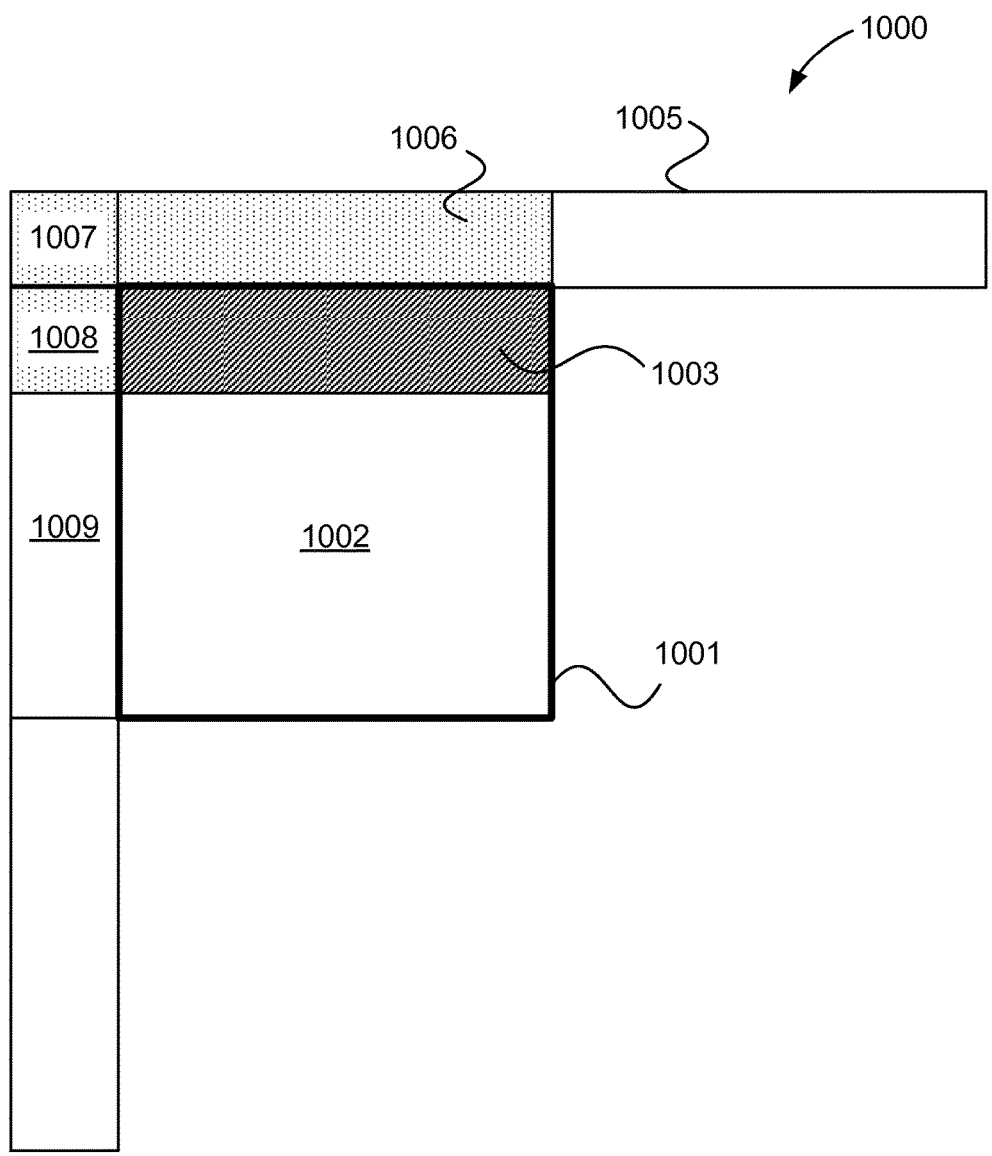
FIG. 10 shows a transform block (TB) associated with a prediction block (PB) that uses a horizontal mode of intra-prediction.

FIG. 10 is a schematic representation showing a transform block (TB) 1001 being predicted with the horizontal intra-prediction mode. The transform block (TB) 1001 includes two regions; an edge region 1003 (illustrated in FIG. 10 with up-right hatching) and a non-edge region 1002. The edge region 1003 includes the top row of samples in the transform block (TB) 1001. Samples in the non-edge region 1002 are populated from a left reference area 1009. The non-edge region 1002 includes all samples in the transform block (TB) 1001 other than the top row of samples in the transform block (TB) 1001. When the 'intra-boundary filter' is applied, samples in the edge region 1003 are populated in accordance with a rule to be described in the step 1128 of FIG. 11. When the intra-boundary filter is not applied, samples in the edge region 1003 are populated with value of a reference sample 1008.

FIG. 11 is schematic flow diagram showing a method 1100 for producing predicted samples for a transform block (TB) using horizontal, vertical or DC intra-prediction modes. When producing predicted samples the method 1100 implements the intra-boundary filter in accordance with certain modes of activation to be described. The method 1100 will be described with reference to the video decoder 134 and the intra-frame prediction module 426 of FIG. 8, however the method 1100 is also performed in the video encoder 114. As noted above, the method 1100 may be implemented in software, hardware, or a combination of the two, for example as part of a special purpose video coding device, or within a general purpose computer.

The method 1100 begins at a determine reference samples step 1102. At the determine reference samples step 1102, the reference sample buffer 803, under control of the processor 205, is populated with reconstructed samples from nearby transform units (TUs), e.g. 702-712. The method 1100 provides a means to control the intra-boundary filter that adapts to the nature of the content in the vicinity of the considered transform block (TB). This adaptivity is beneficial for mixed content, resulting in increased coding efficiency and improved subjective quality. Prior methods provided a mechanism to disable the intra-boundary filter at the slice level. A slice generally includes all coding tree units (CTUs) of one frame. When a frame is divided into multiple slices, the slice boundaries are along the coding tree unit (CTU) raster scan order. Hence, slice level control is not sufficient for delineating between the screen content and camera captured content regions of a frame containing mixed content.

At a filter reference samples step 1104, the reference sample filter module 804, under control of the processor 205, filters the reference samples from the reference sample buffer 803. The filter reference samples step 1104 produces filtered reference samples 816.

At a planar intra-prediction mode test step 1106, the processor 205 tests the intra-prediction mode 454. If the intra-prediction mode is planar intra-prediction, control in the processor 205 passes to a generate planar samples step 1132, otherwise control in the processor 205 passes to a determine neighbour prediction modes step 908.

At the determine neighbour prediction modes step 1108, the processor 205 determines the prediction mode of each coding unit (CU) overlapping the reference samples (e.g. 713). These coding units (CUs) are referred to as the 'neighbouring coding units (CUs)' or more generically as 'neighbouring blocks'. Since the prediction mode is signalled for each coding unit (CU), testing the prediction mode at the granularity of each transform unit (TU) or prediction unit (PU) is generally not required, however testing at this granularity is also possible. In some arrangements intra-block copy is implemented by providing a reference index to the frame currently being reconstructed, so a prediction unit (PU) signalled as using inter-prediction may provide an intra-block copy prediction mode by selecting the current frame for reference, instead of a previous frame. In such arrangements, the reference index, which is specified at the prediction unit (PU) level, is checked to determine the prediction mode of a given prediction unit (PU). Since the prediction modes of the coding units (CUs) overlapping the reference samples were previously determined during parsing syntax elements in the encoded bitstream 312 associated with these coding units (CUs), step 1108 involves accessing memory holding the previously determined prediction modes. Generally the largest transform block (TB) size is 32×32 and generally the smallest coding unit (SCU) size is 8×8. The largest number of prediction mode checks occurs when the current block is the maximum supported size and the neighbouring blocks are all the minimum supported size. In this case, the left edge region, the above edge region, the below-left edge region and the above-right edge region, each include a maximum of four coding units (CUs) and the above-left edge region includes one coding unit (CU), resulting in a maximum of 17 prediction modes to be checked. The smallest number of prediction mode checks occurs when the current transform block (TB) is located two subdivisions within a residual quad-tree (RQT) of a coding unit (CU) and none of the below-left region, the left edge region, the above left edge region, the above edge region or the above-right edge region fall outside the current coding unit (CU). In such cases, only the current coding unit (CU) prediction mode is tested.

At a prediction mode test step 1110, the processor 205 tests the intra-prediction mode 454. If the intra-prediction mode 454 indicates a diagonal angular intra-prediction mode, i.e. modes 2-9, 11-25 or 27-34, control in the processor 205 passes to a generate diagonal angular samples step 1134. If the intra-prediction mode 454 indicates a DC intra-prediction mode, control in the processor 205 passes to a boundary filtering test step 1112. If the intra-prediction mode 454 indicates a non-diagonal angular intra-prediction mode, i.e. modes 10 or 26, control in the processor 205 passes to a boundary filtering test step 1122.

At the boundary filtering test step 1112, the processor 205 tests the transform block (TB) size and the considered colour channel (indicated by a value 'cIdx', according to HEVC). If the transform block (TB) is less than 32×32 and the considered colour channel is the luma colour channel (cIdx is equal to 0), control in the processor 205 passes to a neighbour prediction mode test step 1114. Otherwise, control in the processor passes to a generate unfiltered edge DC step 1116.

At the neighbour prediction modes test step 1114, the processor 205 tests the prediction modes of the neighbouring coding units (CUs), as determined at the step 1108. In a specific implementation, if any of the neighbouring coding units (CUs) are configured to use intra-block copy (or palette prediction mode), control in the processor 205 passes to the generate unfiltered edge DC step 1116. Thus, a predetermined threshold T of (at least) one intra-block copy or palette prediction block among the neighbouring coding units (CUs) may be said to exist. Otherwise, in this specific implementation, if none of the neighbouring coding units (CUs) are configured to use intra-block copy or palette prediction mode, (i.e. the predetermined threshold T is not met) control in the processor 205 passes to a generate filtered DC edge step 1118. The test for intra-block copy or palette prediction mode performed in the step 1114 operates to test the decisions made by the video encoder 114. The video encoder 114 is substantially more likely to select intra-block copy or palette prediction for regions of the frame that contain screen content because of an increased likelihood of replication of information and/or colours through the use of graphical representation of screen content. For regions of the frame that contain camera captured content, the video encoder 114 is highly unlikely to select intra-block copy or palette prediction, as those prediction modes are not tuned to pixel bit-map data. This observation is confirmed by the coding efficiency impact these tools have on frames exclusively containing camera captured content (i.e. almost no coding efficiency impact) and frames exclusively containing screen content (i.e. large coding efficiency improvement). Consequently, the encoder decision may be said to provide information about the content type in the region surrounding the current block.

At the generate unfiltered DC edge step 1116, the DC prediction module 810, under control of the processor 205, populates the DC edge samples 903 with a DC value. The DC value is determined from the filtered reference samples 815. The step 1116 results in a transform block (TB) that contains a uniform DC value. As such, the step 1116 results in an unfiltered transform block (TB), and is generally more suitable for screen content. The step 1116 is performed when the outcome of the step 1114 indicated that neighbouring blocks used intra-block copy or palette prediction, and the current block is more likely to contain screen content.

At the generate filtered DC edge step 1118, the DC prediction module 810, under control of the processor 205, populates the DC edge samples 903 in accordance with the following rule:

predSamples[0][0]=($p$[−1][0]+2*dcVal+$p$[0][−1]+ 2)>>2 predSamples[$x$][0]=($p$[$x$][−1]+3*dcVal+2)>>2, with $x$=1 . . . nTbS−1 predSamples[0][$y$]=($p$[−1][$y$]+3*dcVal+2)>>2, with $y$=1 . . . nTbS−1 predSamples[$x$][$y$]=dcVal, with $x,y$=1 . . . nTbS−1 (these are non-edge samples to be populated in the step 1120 below)

where:

nTbs is the side dimension size of the transform block (TB), e.g. 16 for a 16×16 transform block (TB), p is an array of neighbouring samples, obtained from reconstructed samples and with co-ordinates specified relative to the upper-left sample of the current transform block (TB), predSamples[x][y] is the array of prediction samples being generated for the considered transform block (TB), and dcVal is the DC value determined from the filtered reference samples.

The rule above results in the edge samples 903 being populated with a weighted average of dcVal and the neighbouring samples. The weighted averaging process provides a 'smoothing' effect that is beneficial for camera captured content but can reduce the accuracy of the predicted samples for screen content.

The step 1118 results in edge samples of the current transform block (TB) that are slightly filtered, or 'smoothed' based on samples in the neighbouring transform block (TB). This smoothing provides a benefit for camera captured content, as the 'sharp' edge that would otherwise result is smoothed out along the transform block (TB) boundary. As such, when neighbouring blocks do not use intra-block copy or palette prediction, it is likely that a transform block (TB) includes camera captured content and as such, the intra-boundary filter should be applied.

At a generate non-edge samples step 1120, the DC prediction module 810, under control of the processor 205, populates the DC non-edge samples 902 with a DC value. The DC value is determined from the filtered reference samples 816. As such the combination of steps 1116 and 1120, or alternatively steps 1118 and 1120, provide for the generation of predicted samples for the transform block (TB).

At the boundary filtering test step 1122, the processor 205 tests the transform block (TB) size and the considered colour channel (indicated by a value 'cIdx'). If the transform block (TB) is less than 32×32 and the considered colour channel is the luma colour channel (cIdx is equal to 0), and a disable boundary filter flag, decoded from the encoded bitstream 312, indicates that boundary filtering is not disabled, control in the processor 205 passes to a neighbour prediction mode test step 1124. Otherwise, control in the processor passes to a generate unfiltered edge H/V step 1126.

At the neighbour prediction modes test step 1124, the processor 205 tests the prediction modes of the neighbouring coding units (CUs), as determined at the step 1108. If any of the neighbouring coding units (CUs) are configured to use intra-block copy (or palette prediction mode), control in the processor 205 passes to the generate unfiltered edge H/V step 1126. Otherwise, if none of the neighbouring coding units (CUs) are configured to use intra-block copy or palette prediction mode, control in the processor 205 passes to a generate filtered H/V edge step 1128.

At the generate unfiltered H/V edge step 1126, the H/V prediction module 808, under control of the processor 205, populates the edge samples 1003 with edge values. The edge values are determined from the filtered reference samples. The step 1126 results in a transform block (TB) that contains unsmoothed intra-predicted samples. As such, the step 1116 results in an unfiltered transform block (TB), which is generally more suitable for screen content, e.g. where sharp edges are being propagated through the block. The step 1116 is performed when the outcome of the step 1114 indicated that neighbouring blocks used intra-block copy or palette prediction, and the current block is more likely to contain screen content.

At the generate filtered H/V edge step 1128, the H/V prediction module 808, under control of the processor 205, populates the edge samples 1003 in accordance with the following rule for vertical intra-prediction:

With x=0, y=0 . . . nTbS−1:

$$predSamples[x][y]=Clip1Y(p[x][-1]+((p[-1][y]-p[-1][-1])>>1))$$

where;

nTbs is the side dimension size of the transform block (TB), e.g. 16 for a 16×16 transform block (TB), Clip1Y is a clip operation to prevent sample values outside of the range afforded by the sample bit-depth, p is an array of neighbouring samples, obtained from reconstructed samples and with co-ordinates specified relative to the upper-left sample of the current transform block (TB), and predSamples[x][y] is the array of prediction samples being generated for the considered transform block (TB).

The rule above results in population of each sample in the edge samples 1003 (a column of samples along the left edge of the considered transform block (TB)) with a weighted average of the reference sample located above the edge samples 1003 (i.e. p[x][−1])m the reference sample located above-left of the edge samples 1003 (i.e. p[−1][−1]) and the reference sample located to the left of the considered sample of the edge samples 1003 (i.e. p[−1][y]. This weighted averaging results in a smoother transition along the left edge of the transform block (TB), which is beneficial for camera captured content but can be detrimental for screen content regions of frame data. For the horizontal intra-prediction case, this rule is flipped along the diagonal axis, such that the filtering is applied to the top row of samples in the considered transform block (TB).

The step 1128 results in edge samples of the current transform block (TB) that are slightly filtered, or 'smoothed' based on samples in the neighbouring transform block (TB). This smoothing provides a benefit for camera captured content, as the 'sharp' edge that would otherwise result is smoothed out along the transform block (TB) boundary. As such, when neighbouring blocks do not use intra-block copy or palette prediction, it is likely that transform block (TB) includes camera captured content and as such, the intra-boundary filter should be applied.

At a generate non-edge samples step 1130, the H/V prediction module 808, under control of the processor 205, populates the non-edge samples 1002 with predicted samples generated from the filtered reference samples. As such the combination of steps 1126 and 1130, or alternatively steps 1128 and 1130, provide for the generation of predicted samples for the transform block (TB).

For horizontal intra-prediction, the steps 1128-1130 are performed with x and y swapped, resulting in symmetry along a diagonal axis through the considered transform block (TB).

At the generate planar samples step 1132, the planar prediction module 811, under control of the processor 205, generates a block of predicted samples having intensity varying in a 'plane', with the average value, horizontal gradient and vertical gradient determined from the reference samples.

At the generation diagonal angular samples step 1134, the angular prediction module 809, under control of the processor 205, generates a block of predicted samples in accordance with the direction of the angular intra-prediction mode.

Once the block of predicted samples has been produced by performing the steps 1102-1134, a reconstruction module 1138, under control of the processor 205, combines the blocks of predicted samples 1136 to form a block 1140 for the transform unit being coded. The resulting block 1140 is outputted. The method 1100 then terminates. In the video encoder 114, the resulting block is output to the summation module 342 via the multiplexer module 340. In the video decoder 134, the resulting block is output to the summation module 424 via the multiplexer 428. In both cases, the resulting block 1136 (382,466) is combined (342,424) with residual samples (368,456) to produce reconstructed samples (370, 458).

In one arrangement of the method 1100, the steps 1114 and 1124 are modified such that the threshold T is varied to values other than one. For example, a value of two or three may be used. Such variation provides a higher threshold before the intra-boundary filter is disabled. Hence, in the case of spurious intra-block copy or palette prediction neighbours that were selected by the video encoder 114 in a region of the frame that contains camera captured content, the filter is less likely to be disabled, preventing unintended degradation of the predicted samples for camera captured content regions of the frame. Regions of the frame containing screen content are expected to have many blocks using intra-block copy or palette prediction and thus would still meet the increased threshold T and hence provide the improved predicted samples.

In another arrangement of the method 1100, the steps 1114 and 1124 are modified such that the threshold T is a pre-defined proportion of the total number of neighbouring coding units (CUs) or neighbouring transform units (TUs) to be tested. In such arrangements it is necessary to produce a total count of the number of the neighbouring coding units (CUs) or neighbouring transform units (TUs) and then to determine a threshold based on this count. For example, the threshold could be set to one quarter or one eighth of the number of neighbouring coding units (CUs). A minimum threshold value of one could be applied to prohibit the case where the intra-boundary filter is always disabled for particular configurations of the neighbouring coding units (CUs). The benefit of such arrangements is further improved resilience to spuriously selected intra-block copy or palette prediction mode coding units (CUs) in camera captured content regions of the frame.

In yet another arrangement of the method 1100, the neighbouring coding units (CUs) are configured such that the above-left region, the above region, and the above-right region, are considered as not available as these regions lie in a different coding tree unit (CTU). In such cases, the prediction modes of these regions lie in the previous row of coding tree units (CTUs), when considered in raster scan order. Prohibiting testing of these regions eliminates the need for a 'line buffer' to hold prediction modes of coding units (CUs) from the previous row of coding tree units (CTUs).

In yet another arrangement of the method 1100, a disable CTU boundary filter (DCF) flag (not illustrated) can be formed and encoded at the CTU level into the encoded bitstream 312 by the entropy encoder 324. The DCF flag is provided to signal, at the coding tree unit (CTU) level, if the intra-boundary filter is disabled for all coding units (CUs) in the associated coding tree unit (CTU). Thus, the video encoder 114 is able to control application of the intra-boundary filter at the CTU level. Control at the CTU level provides improved performance when processing mixed content, compared to control at a higher level, such as the slice level, at a cost of introducing signalling of one flag per CTU into the encoded bitstream 312. The granularity of control at the CTU level generally corresponds to control over each 64×64 luma sample region of the frame. In such arrangements, the entropy decoder 420 must decode the DCF flag and the steps 1114 and 1124 are modified such that the DCF flag is tested in order to determine whether to apply the intra-boundary filter. The DCF flag uses one context coded bin in order to reduce signalling overhead. In such arrangements, the encoder must decide the DCF flag value to encode into the encoded bitstream 312.

In yet another arrangement of the method 1100, a disable CU boundary filter (DCUF) flag (not illustrated) can be formed and encoded at the CU level into the encoded bitstream 312 by the entropy encoder 324. The DCUF flag is provided to signal, at the coding unit (CU) level, if the intra-boundary filter is disabled for all prediction units (PUs) in the associated coding unit (CU). Thus, the video encoder 114 is able to control application of the intra-boundary filter at the CU level. Control at the CU level provides improved performance when processing mixed content, compared to control at a higher level, such as the coding tree unit (CTU) level or the slice level. In such arrangements, the entropy decoder 420 must decode the DCUF flag and the steps 1114 and 1124 are modified such that the DCUF flag is tested in order to determine whether to apply the intra-boundary filter. The DCUF flag uses one context coded bin in order to reduce signalling overhead. In such arrangements, the encoder must decide the DCUF flag value to encode into the encoded bitstream 312.

In another arrangement of the video decoder 134 and the video encoder 114, the step 1108 is modified such that only a subset of the neighbouring blocks are checked. Checking only neighbouring blocks in the 'left edge' region (e.g. 703-704) and in the 'above edge' region (e.g. 706-709) is possible. In such arrangements, less testing is performed in the steps 1114 and 1124. Moreover, the availability of the 'below-left edge' region and the 'above-right edge' region depends on the position of the considered transform block (TB) in the Z scan order, and thus a spatial bias may be present in the control of the boundary filter which could have a subjective quality impact. In this arrangement, the 'below-left edge' and the 'above-right edge' are not considered and thus this bias is removed.

In further arrangements of the video decoder 134 and the video encoder 114, the step 1108 is modified such that only blocks at particular locations relative to the current block have their prediction mode tested. In such arrangements, the topmost coding unit (CU) along the left edge region and the leftmost coding unit (CU) along the top edge region are tested. Additional coding units, such as the topmost coding unit CU) within the below-left edge region and the leftmost coding unit (CU) along the top right ledge region may also be tested. In such arrangements, complexity is reduced as no looping over multiple neighbour coding units (CUs) is required as only specific locations of neighbouring coding units (CUs) are tested.

Figure 13:
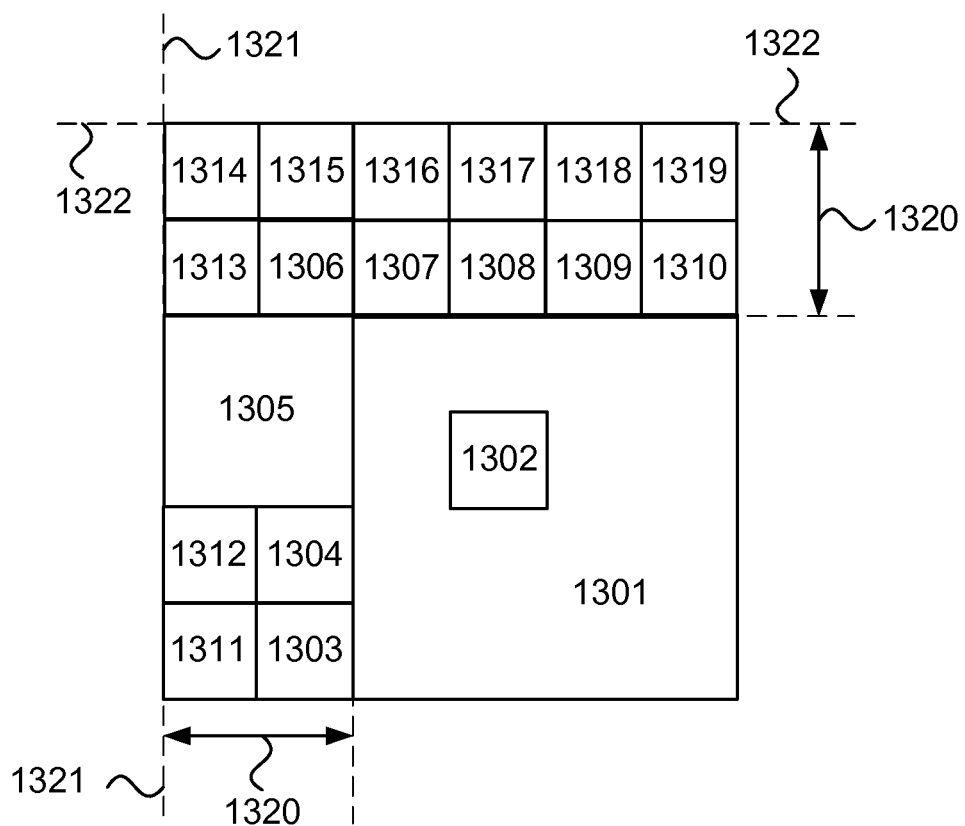
FIG. 13 illustrates an arrangement where the intra-boundary filter is controlled by the prediction modes of coding units (CUs) adjacent to the coding unit (CU) containing the considered transform block (TB)

Further arrangements will be described next with reference to FIG. 13. FIG. 13 illustrates arrangements where the intra-boundary filter is controlled by the prediction mode of coding units (CUs) abutting the coding unit (CU), or the coding tree block (CTB) containing the considered transform block (TB). FIG. 13 illustrates an example of a current coding unit (CU) 1301, configured for intra-prediction, with a residual quad-tree (RQT) that divides the current coding unit (CU) 1301 into multiple transform blocks (TBs), including a transform block (TB) 1302. The transform block (TB) 1302 can be, in this example, the block currently being reconstructed, being a TB within the current CU.

In one arrangement, the step 1108 of the method 1100 is modified such that prediction modes of the neighbouring coding units (CUs), being blocks abutting to the left and top edges and the left-top corner of the current coding unit (CU) 1301, are determined In FIG. 13 those are coding units (CUs) 1303-1310, in which blocks 1303-1305 abut the left edge of the CU 1301, blocks 1307-1310 abut the top edge of the CU 1301, and block 1306 is that which abuts the left-top corner of the CU 1301. In such arrangements, the steps 1112 and 1122 are also modified such that if at least one coding unit (CU) of the coding units (CUs) 1303-1310 is configured to use intra-block copy or palette mode prediction, then the intra-boundary filter is disabled for all transform blocks (TBs) within the coding unit (CU) 1301. Otherwise, the intra-boundary filter is enabled depending on the transform block (TB) size, the colour index cIdx and the intra-prediction mode.

Figure 15:
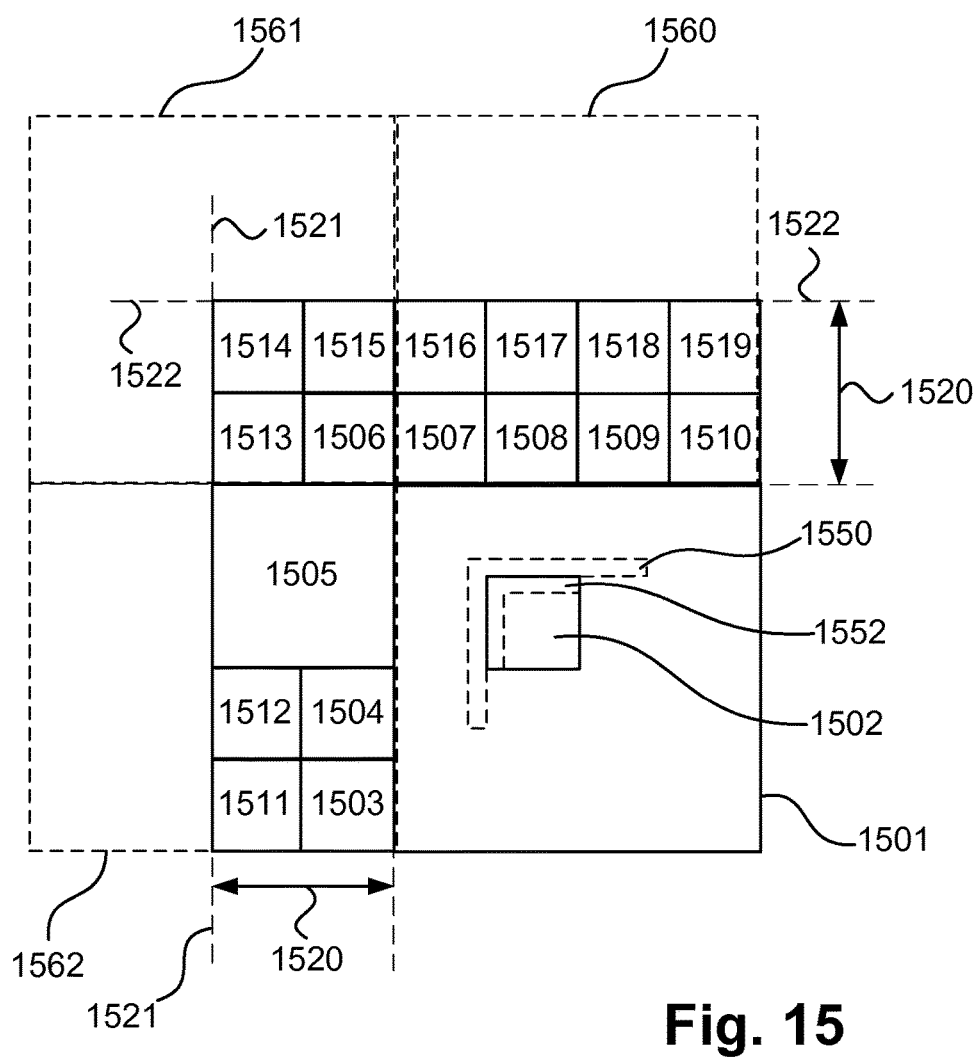
FIG. 15 is a representation similar to FIG. 13 illustrating relevance of the described operations to coding transform units (CTUs); and Appendix A arranged at the end of the Detailed Description shows an example of the 'working draft' text of the high efficiency video coding (HEVC) standard as altered to accord with one or more of the presently described arrangements.

In another arrangement, shown in FIG. 15 (having remarkable similarity to FIG. 13), a coding tree unit (CTU) 1501 has a coding unit (CU) (not illustrated) and the coding unit (CU) has a transform block (TB) 1502 for which neighbouring samples 1550 and edge samples 1552 are generally depicted in a manner akin to FIGS. 9 and 10. Notwithstanding this depiction, with respect to the coding tree unit (CTU) 1501, neighbouring blocks 1560, 1561 and 1562 are also shown. Steps 1112 and 1122 may be accordingly modified in a manner akin to that described above with respect to FIG. 13 to operate on the CTU 1501 for the TB 1502.

In another arrangement, the step 1108 is modified such that if any coding unit (CU) in a coding tree unit (CTU), abutting to the left or top edges, or the above-left the current coding tree unit (CTU) is configured to use intra-block copy or palette prediction, then the intra-boundary filter is disabled for all transform blocks (TBs) within the current coding tree unit (CTU). Otherwise, the intra-boundary filter is enabled depending on the transform block (TB) size, the colour index cIdx and the intra-prediction mode.

In yet another arrangement, the step 1108 of the method 1100 is modified such that prediction modes of the neighbouring coding units (CUs) that meet a pre-defined neighbourhood criterion are checked. The neighbourhood criterion includes such coding units (CUs) that at least one sample of the coding unit (CU) is located inside an area limited on the left by a threshold line 1321 and on the right by the right edge of the coding unit (CU) 1301, and on the top by a threshold line 1322 and the bottom by the bottom edge of the coding unit (CU) 1301. The threshold line 1321 is defined to be located at a pre-defined threshold distance 1320, to the left and parallel to the left edge of the coding unit (CU) 1301. The threshold line 1322 is defined to be located at the pre-defined threshold distance 1320, above and parallel to the top edge of the coding unit (CU) 1301. In such an arrangement the neighbouring blocks are said to be determined from the threshold distance 1320.

Such arrangements only require performing the determination of the prediction modes of neighbouring coding units (CUs) once for each coding tree block (CTB). This reduction in checking reduces the amount of computations of the step 1108 required per coding unit (CU).

Figure 12:
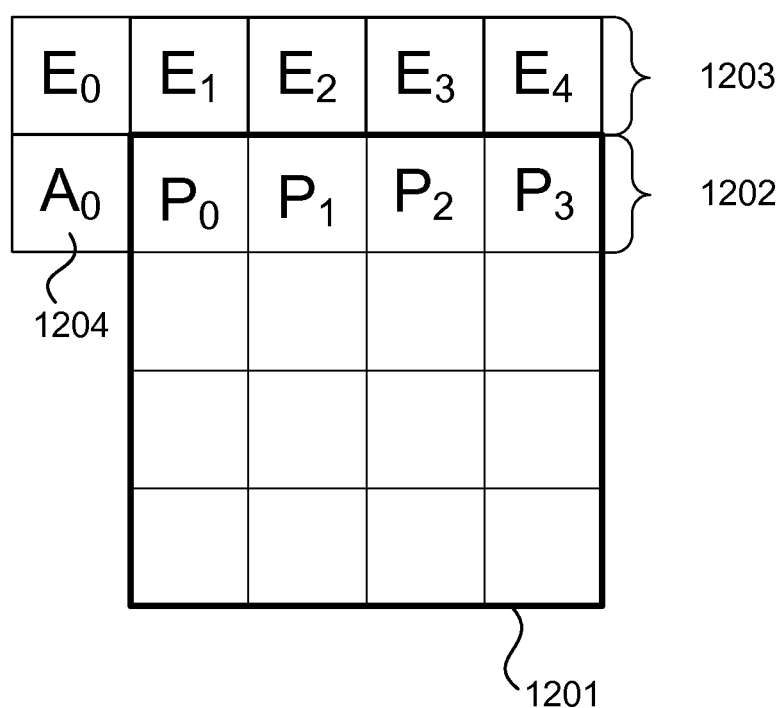
FIG. 12 shows an example of a transform block (TB) predicted using an intra-prediction mode.

An example illustrating advantages of the above embodiments will be described next with reference to FIGS. 9 and 12. In the example of FIG. 12, a transform block (TB) 1201 is predicted using horizontal intra-prediction mode (mode 10 of FIG. 6). According to the method 1100, an edge row 1202 of the transform block (TB) 1202 can be built either using implementations of the step 1126 or step 1128, as determined by the steps 1106, 1110, 1122 and 1124.

According to an implementation of the step 1126, the row 1202 may be built by assigning a value $A_0$ of an intra-reference sample 1204 to all samples in the row 1202. The value $A_0$ is spatially close to a value $E_0$ of a row 1203, which is located above the predicted row 1202. For natural image content, spatial proximity gives a good probability that the values $P_0$ (which is a copy of $A_0$) and $E_0$ will be close or equal to each other. As the value $A_0$ is propagated along the row 1202, further from its original location, there is an increasing probability that the value $A_0$ will be significantly different from neighbouring sample values ($E_1$, $E_2$, $E_3$). The situation when two neighbour samples have a significant difference in values is known as 'sharp edge'. Sharp edges are not typical for natural content, but are typical for screen content that usually has many bordered graphical elements such as windows, individual controls, etc. Therefore a prediction of a transform block (TB) that forms a sharp edge may not be a good predictor for natural content, and may be a good predictor for screen content.

According to an implementation of the step 1128, the values of samples of the row 1202 are derived using an intra-boundary filter that smooths possible sharp edges. Such a smoothed prediction is therefore preferable for natural content but not for screen content.

Figure 14:
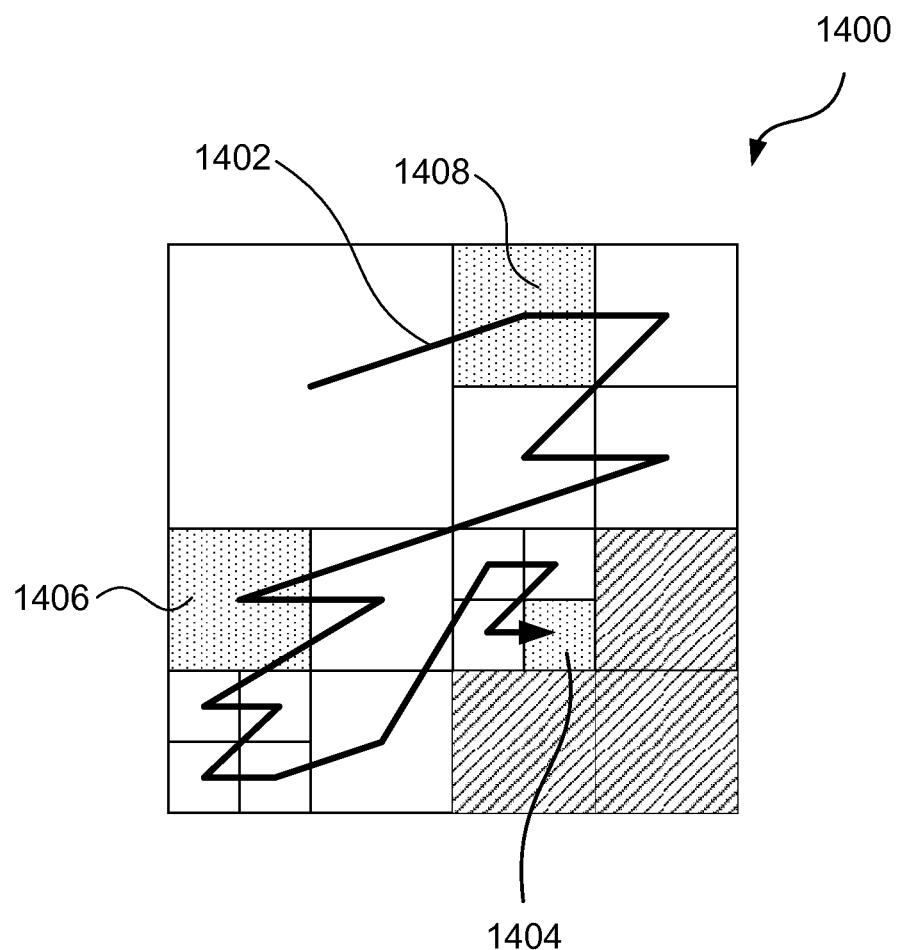
FIG. 14 is a schematic block diagram showing an arrangement where the intra-boundary filter is controlled by the prediction modes of coding units (CUs) preceding the current coding unit (CU) in Z scan order.

FIG. 14 is a schematic representation showing an arrangement where the intra-boundary filter is controlled by the prediction modes of coding units (CUs) preceding the current coding unit (CU) in Z scan order. A coding tree unit (CTU) 1400 is divided into several coding units (CUs), such as coding units (CUs) 1406 and 1408, according to a set of split flags associated with the coding tree unit (CTU) 1400. Split flags are known according to HEVC and are used to split square regions into four child regions. The coding units (CUs) are scanned in a Z scan order, as described with reference to FIG. 5. The scan order 1402 shows the order in which the coding units (CUs) are scanned in the coding tree unit (CTU) 1400. A current coding unit (CU) 1404 is configured to use intra-prediction and is being reconstructed. The region of the coding tree unit (CTU) 1400 shaded in up-right diagonal lines is not yet reconstructed.

In an arrangement of the method 1100 performed by the video encoder 114 and the video decoder 134, the determine prediction modes step 1108 is modified such that the prediction modes of a set of coding units (CUs) preceding the coding unit (CU) 1404, in the Z scan order, is determined. The set of coding units (CUs) may be considered as 'neighbouring coding units (CUs)' or 'neighbouring blocks', as the Z-scan order provides some degree of spatial locality. The set of coding units (CUs) is fixed in number and the spatial arrangement of these coding units (CUs) is affected by the split flags associated with the coding tree unit (CTU) 1400. The set of coding units (CTUs) may span multiple coding tree units (CTUs). In particular, coding units (CUs) from the previous coding tree unit (CTU) in raster scan order. Coding units (CUs) from coding tree units (CTUs) in a different slice or tile are not included in the set of coding units (CUs). If at least one coding unit (CU) belonging to the set is configured to use intra-block copy or palette mode prediction, then the intra-boundary filter is disabled for transform blocks (TBs) in the current coding unit (CU) (i.e. 1404). Otherwise, if none of the coding units (CU) belonging to the set are configured to use intra-block copy or palette mode prediction, then the intra-boundary filter is enabled. As the set size is fixed, such arrangements may be implemented using a shift register, with each bit of the shift register corresponding to a previous coding unit (CU) in the Z scan order. The length of the shift register would correspond to the size of the set of coding units (CUs). Each bit would signal either 'screen content' prediction modes, i.e. intra-block copy or palette mode prediction, or 'camera captured content' prediction modes, i.e. intra-prediction or inter-prediction. Checking the entire set would require one comparison operation of the shift register contents. A set size not exceeding 32-bits may afford a complexity reduction in architectures as the shift register would not exceed the native word size of such architectures. The fixed set size provides some spatial locality to the control of the intra-boundary filter for a current coding unit. For example, a set size of the previous ten (10) coding units (CUs) would result in the coding unit (CU) 1406 being included in the set and the coding unit (CU) 1408 being excluded from the set. Use of a shift register to provide localised prediction mode information affords low complexity. Also, the need to determine the prediction modes of specific coding units (CUs) surrounding the current coding unit (CU) is avoided. This is beneficial because the many possible arrangements of coding tree units (CTUs) and residual quad-trees (RQTs) would result in more complex checking logic to select the desired blocks. As individual coding units (CUs) generally vary in size from 8×8 to 64×64 luma samples, the area of the frame data 310 occupied by the set of coding units (CUs) varies considerably. In a variant of arrangements described with reference to FIG. 14, the size of the shift operation is dependent on the size of the considered coding unit (CU), with smaller coding units (CUs) resulting in a reduced shift amount. For example, a shift of one bit occurs for an 8×8 coding unit (CU), a shift of four bits occurs for a 16×16 coding unit (CU), a shift of sixteen bits occurs for a 32×32 coding unit (CU), and a shift of 64 bits occurs for a 64×64 coding unit (CU). A shift register of 64 bits would thus provide sufficient storage for an area of one coding tree unit (CU). Such arrangements provide a constant size area that is considered for control of the intra-boundary filter of the current coding unit (CU). In an alternative with reduced shift register size, the following shift operations are performed:

8×8 CU: Shift by 1 bit
16×16 CU: Shift by 4 bits
32×32 CU: Shift by 16 bits
64×64 CU: Shift by 16 bits.

Using a 32-bit shift register to accord with the native word size of many architectures.

In an alternative to the arrangement using a shift-register, a counter is used instead. In such arrangements, the counter is set to a predetermined value (e.g. zero) each time a coding unit (CU) configured to use intra-block copy is encountered, otherwise the counter is adjusted (e.g. incremented). When the counter reaches a threshold value (e.g. thirty-two) it is no longer adjusted. If the counter value is below the threshold value, the intra-boundary filter is not applied, otherwise (the counter value is equal to the threshold value), the intra-boundary filter is applied. At the beginning of a slice, the counter is set to the threshold value. In an equivalent variation of this arrangement, the counter is set to a threshold value (e.g. thirty-two) each time a coding unit (CU) configured to use intra-block copy is encountered, otherwise the counter is adjusted (e.g. decremented). When the counter reaches a threshold value (e.g. zero) it is no longer adjusted. If the counter value is nonzero, the intra-boundary filter is not applied, otherwise (the counter value is zero), the intra-boundary filter is applied. At the beginning of a slice, the counter is set to zero.

Implementations of the steps 1108, 1110, 1112, 1122, 1114 and 1124 described above provide methods of determining transform block (TB) prediction methods depending on the type of content, when the type of the content is not known a priori, including but not limited to the cases when natural and screen content are both present on the same picture. Such methods provide a local adaptivity of the application of the intra-boundary filter. This adaptivity provides an advantage for mixed content.

Although the example of FIG. 12 applies to a particular case of a transform block (TB) predicted using horizontal intra-prediction, the above embodiments can be applied to other cases, such as DC and vertical intra-prediction.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

APPENDIX A

What follows is an example of the 'working draft' text of the high efficiency video coding (HEVC) standard as altered to accord with one or more of the presently described arrangements.

8.4.5.2.1 General Intra Sample Prediction
Inputs to this process are:
a sample location (xTbCmp, yTbCmp) specifying the top-left sample of the current transform block relative to the top left sample of the current picture,
a variable predModeIntra specifying the intra prediction mode,
a variable nTbS specifying the transform block size,
a variable cIdx specifying the colour component of the current block.
Output of this process is the predicted samples predSamples[x][y], with x, y=0 . . . nTbS−1.
The nTbS*4+1 neighbouring samples p[x][y] that are constructed samples prior to the deblocking filter process, with x=−1, y=−1 . . . nTbS*2−1 and x=0 . . . nTbS*2−1, y=−1, are derived as follows:
The neighbouring location (xNbCmp, yNbCmp) is specified by:

(xNbCmp,yNbCmp)=(xTbCmp+$x$,yTbCmp+$y$)  (8 27)

The current luma location (xTbY, yTbY) and the neighbouring luma location (xNbY, yNbY) are derived as follows:

(xTbY,yTbY)=(cIdx==0)?(xTbCmp,yTbCmp):
 (xTbCmp*SubWidthC,yTbCmp*SubHeightC)  (8 28)

(xNbY,yNbY)=(cIdx==0)?(xNbCmp,yNbCmp):
 (xNbCmp*SubWidthC,yNbCmp*SubHeightC)  (8 29)

The availability derivation process for a block in z-scan order as specified in subclause 6.4.1 is invoked with the current luma location (xCurr, yCurr) set equal to (xTbY, yTbY) and the neighbouring luma location (xNbY, yNbY) as inputs, and the output is assigned to availableN.
Each sample p[x][y] is derived as follows:
If one or more of the following conditions are true, the sample p[x][y] is marked as "not available for intra prediction":
The variable availableN is equal to FALSE.
CuPredMode[xNbY][yNbY] is not equal to MODE_INTRA and constrained_intra_pred_flag is equal to 1.
Otherwise, the sample p[x][y] is marked as "available for intra prediction" and the sample at the location (xNbCmp, yNbCmp) is assigned to p[x][y].
To derive the value of the edge filtering flag edgeFilter the following ordered steps apply:
1. The edgeFilter flag is set equal to 1,
2. For x=−1, y=−1 . . . nTbS*2−1 and x=0 . . . nTbS*2−1, y=−1, when p[x][y] is not marked as "not available for intra prediction" and the edgeFilter flag value is equal to 1:
The neighbouring location (xNbCmp, yNbCmp) is specified by:

(xNbCmp,yNbCmp)=(xTbCmp+$x$,yTbCmp+$y$)

The neighbouring luma location (xNbY, yNbY) is derived as follows:

(xNbY,yNbY)=(cIdx==0)?(xNbCmp,yNbCmp):
 (xNbCmp*SubWidthC,yNbCmp*SubHeightC)

If one or more of the following conditions are true, the edgeFilter flag value is set to 0,
CuPredMode[xNbY][yNbY] is equal to MODE_INTRABC,
CuPredMode[xNbY][yNbY] is equal to MODE_PALETTE.
When at least one sample p[x][y] with x=−1, y=−1 . . . nTbS*2−1 and x=0 . . . nTbS*2−1, y=−1 is marked as "not available for intra prediction", the reference sample substitution process for intra sample prediction in subclause 8.4.4.2.2 is invoked with the samples p[x][y] with x=−1, y=−1 . . . nTbS*2−1 and x=0 . . . nTbS*2−1, y=−1, nTbS, and cIdx as inputs, and the modified samples p[x][y] with x=−1, y=−1 . . . nTbS*2−1 and x=0 . . . nTbS*2−1, y=−1 as output.
Depending on the value of predModeIntra, the following ordered steps apply:
1. When intra_smoothing_disabled_flag is equal to 0 and either cIdx is equal to 0 or ChromaArrayType is equal to 3, the filtering process of neighbouring samples specified in subclause 8.4.4.2.3 is invoked with the sample array p and the transform block size nTbS as inputs, and the output is reassigned to the sample array p.
2. The intra sample prediction process according to predModeIntra applies as follows:
If predModeIntra is equal to INTRA_PLANAR, the corresponding intra prediction mode specified in subclause 8.4.4.2.4 is invoked with the sample array p and the transform block size nTbS as inputs, and the output is the predicted sample array predSamples.
Otherwise, if predModeIntra is equal to INTRA_DC, the corresponding intra prediction mode specified in subclause 8.4.4.2.5 is invoked with the sample array p, the transform block size nTbS, the colour component index cIdx and the edge filtering flag edgeFilter as inputs, and the output is the predicted sample array predSamples.
Otherwise (predModeIntra is in the range of INTRA_ANGULAR2 . . . INTRA_ANGULAR34), the corresponding intra prediction mode specified in subclause 8.4.4.2.6 is invoked with the intra prediction mode predModeIntra, the sample array p, the transform block size nTbS, the colour component index cIdx and the edge filtering flag edgeFilter as inputs, and the output is the predicted sample array predSamples.

8.4.5.2.5 Specification of intra prediction mode INTRA_DC

Inputs to this process are:

the neighbouring samples p[x][y], with x=−1, y=−1 . . . nTbS*2−1 and x=0 . . . nTbS*2−1, y=−1, a variable nTbS specifying the transform block size, a variable cIdx specifying the colour component of the current block, a variable edgeFilter specifying an edge filtering mode for the current block.

Outputs of this process are the predicted samples predSamples[x][y], with x, y=0 . . . nTbS−1.

The values of the prediction samples predSamples[x][y], with x, y=0 . . . nTbS−1, are derived by the following ordered steps:

1. A variable dcVal is derived as follows:

dcVal=    (8 41)

where $k$=Log 2(nTbS).

2. Depending on the value of the colour component index cIdx, the following applies:

If cIdx is equal to 0 and nTbS is less than 32 and edgeFilter is equal to 1, the following applies:

predSamples[0][0]=(p[−1][0]+2*dcVal+ p[0][−1]+2)>>2    (8 42)

predSamples[x][0]=(p[x][−1]+3*dcVal+2)>>2, with x=1 . . . nTbS−1    (8 43)

predSamples[0][y]=(p[−1][y]+3*dcVal+2)>>2, with y=1 . . . nTbS−1    (8 44)

predSamples[x][y]=dcVal, with x,y=1 . . . nTbS−1    (8 45)

Otherwise, the prediction samples predSamples[x][y] are derived as follows:

predSamples[x][y]=dcVal, with x,y=0 . . . nTbS−1    (8 46)

8.4.5.2.6 Specification of intra prediction mode in the range of INTRA_ANGULAR2 . . . INTRA_ANGULAR34

Inputs to this process are:

the intra prediction mode predModeIntra, the neighbouring samples p[x][y], with x=−1, y=−1 . . . nTbS*2−1 and x=0 . . . nTbS*2−1, y=−1, a variable nTbS specifying the transform block size, a variable cIdx specifying the colour component of the current block, a variable edgeFilter specifying an edge filtering mode for the current block.

. . . (skipped text) . . .

The variable disableIntraBoundaryFilter is derived as follows:

If implicit_rdpcm_enabled_flag and cu_transquant_bypass_flag are both equal to 1, disableIntraBoundaryFilter is set equal to 1, Otherwise, if edgeFilter is equal to 1, disableIntraBoundaryFilter is set equal to 1, Otherwise, disableIntraBoundaryFilter is set equal to 0.

. . . (skipped text) . . .

We claim:

1. A method of decoding a current block encoded using intra-prediction, the method comprising:

determining prediction modes for coding blocks neighbouring the current block;

generating prediction values for edge samples of the current block from intra-prediction reference samples of the neighbouring coding blocks by applying an intra-prediction process to the intra-prediction encoded current block if a number of the neighbouring coding blocks determined to use a prediction mode that is one of an intra-block copy prediction mode and a palette mode is greater than or equal to a predetermined threshold;

alternatively generating the prediction values for the edge samples of the current block from intra-prediction reference samples of the neighbouring coding blocks by applying a filter to reference samples of the neighbouring blocks; and decoding the current block based on the prediction values.

2. The method according to claim 1, where the predetermined threshold is equal to one (1).

3. The method according to claim 1, where the predetermined threshold is determined as an amount of blocks corresponding to a pre-defined proportion of neighbouring blocks determined to use the intra-block copy prediction mode or palette mode to the total amount of neighbouring blocks.

4. The method according to claim 1, where the neighbouring blocks are the blocks corresponding to the reference samples.

5. The method according to claim 1, where the neighbouring blocks are the blocks at least abutting left and above edges of a coding unit (CU) of the current block.

6. The method according to claim 5, wherein the neighbouring blocks further include a block abutting a left-top corner of the coding unit (CU) of the current block.

7. The method according to claim 1, where the neighbouring blocks are the blocks abutting at least left and above edges of a coding tree unit (CTU) of the current block.

8. The method according to claim 7, wherein the neighbouring blocks further include a block abutting a left-top corner of the coding tree unit (CTU) of the current block.

9. The method according to claim 1, where the neighbouring blocks are determined according to a pre-defined threshold distance.

10. A method according to claim 1, wherein the filter is an intra-boundary filter.

11. A decoder decoding a current block encoded using intra-prediction, the decoder comprising:

a determining module configured to determine prediction modes for coding blocks neighbouring the current block;

a generator configured to generate prediction values for edge samples of the current block from intra-prediction reference samples of the neighbouring coding blocks by applying an intra-prediction process to the intra-prediction encoded current block if a number of the neighbouring coding blocks determined to use a prediction mode that is one of an intra-block copy prediction mode and a palette mode is greater than or equal to a predetermined threshold;

alternatively generating the prediction values for the edge samples of the current block from intra-prediction reference samples of the neighbouring coding blocks by applying a filter to reference samples of the neighbouring blocks; and a decoder module configured to decode the current block based on the prediction values.

12. The decoder according to claim 11, where the predetermined threshold is equal to one (1).

13. The decoder according to claim 11, where the predetermined threshold is determined as an amount of blocks corresponding to a pre-defined proportion of neighbouring blocks determined to use the intra-block copy prediction mode or palette mode to the total amount of neighbouring blocks.

14. The decoder according to claim 11, where the neighbouring blocks are the blocks corresponding to the reference samples.

15. The decoder according to claim 11, where the neighbouring blocks are the blocks at least abutting left and above edges of the coding unit (CU) of the current block, and the neighbouring blocks further include a block abutting a left-top corner of the coding unit (CU) of the current block.

16. The decoder according to claim 11, where the neighbouring blocks are the blocks abutting at least left and above edge of the coding tree unit (CTU) of the current block; and the neighbouring blocks further include a block abutting a left-top corner of the coding tree unit (CTU) of the current block.

17. The decoder according to claim 11, where the neighbouring blocks are determined according to a pre-defined threshold distance.

18. A method of encoding a current block using intra-prediction, the method comprising:
 determining a prediction mode for coding blocks neighbouring the current block;
 generating prediction values for edge samples of the current block from intra-prediction reference samples of the neighbouring coding blocks by applying an intra-prediction process to the intra-prediction encoded current block if a number of the neighbouring coding blocks determined to use a prediction mode that is an intra-block copy prediction mode or a palette mode is greater than or equal to a predetermined threshold;
 otherwise generating the prediction values for the edge samples of the current block from intra-prediction reference samples of the neighbouring coding blocks by applying a filter to reference samples of the neighbouring blocks; and
 using the generated prediction values and the determined intra-prediction mode to encode the current block.

19. A non-transitory computer readable storage medium having a program recorded thereon, the program being executable by a processor to decode a current block encoded using intra-prediction, the program comprising:
 code for determining prediction modes for coding blocks neighbouring the current block;
 code for generating prediction values for edge samples of the current block from intra-prediction reference samples of the neighbouring coding blocks by applying an intra-prediction process to the intra-prediction encoded current block if a number of the neighbouring coding blocks determined to use a prediction mode that is one of an intra-block copy prediction mode and a palette mode is greater than or equal to a predetermined threshold;
 code for alternatively generating the prediction values for the edge samples of the current block from intra-prediction reference samples of the neighbouring coding blocks by applying a filter to reference samples of the neighbouring blocks; and
 code for decoding the current block based on the prediction values.

20. A video decoder for decoding a current block encoded using intra-prediction, the decoder comprising a processor coupled to a memory, the memory having a program recorded thereon and executable by the processor, the program comprising:
 code for determining prediction modes for coding blocks neighbouring the current block;
 code for generating prediction values for edge samples of the current block from intra-prediction reference samples of the neighbouring coding blocks by applying an intra-prediction process to the intra-prediction encoded current block if a number of the neighbouring coding blocks determined to use a prediction mode that is one of an intra-block copy prediction mode and a palette mode is greater than or equal to a predetermined threshold;
 code for alternatively generating the prediction values for the edge samples of the current block from intra-prediction reference samples of the neighbouring coding blocks by applying a filter to reference samples of the neighbouring blocks; and
 code for decoding the current block based on the prediction values.

* * * * *